United States Patent
Meirosu et al.

(10) Patent No.: US 10,469,343 B2
(45) Date of Patent: Nov. 5, 2019

(54) PATH CONTINUITY DETERMINATION IN AN AGGREGATE FLOW ENVIRONMENT

(71) Applicant: Telefonaktiebolaget LM Ericsson (publ), Stockholm (SE)

(72) Inventors: Catalin Meirosu, Solna (SE); Chunyan Fu, Sundbyberg (SE); Wolfgang John, Årsta (SE); James Kempf, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 577 days.

(21) Appl. No.: 15/146,318

(22) Filed: May 4, 2016

(65) Prior Publication Data
US 2017/0324625 A1    Nov. 9, 2017

(51) Int. Cl.
*H04L 12/26* (2006.01)
*H04L 29/06* (2006.01)
*H04L 12/721* (2013.01)

(52) U.S. Cl.
CPC ........ *H04L 43/026* (2013.01); *H04L 43/0811* (2013.01); *H04L 45/38* (2013.01); *H04L 69/22* (2013.01); *Y02D 50/30* (2018.01)

(58) Field of Classification Search
CPC ... H04L 43/026; H04L 43/0811; H04L 45/38; H04L 69/22
See application file for complete search history.

(56) References Cited

U.S. PATENT DOCUMENTS 6,854,117 B1 * 2/2005 Roberts ............... G06F 15/8053
370/392
6,977,932 B1 * 12/2005 Hauck ................. H04L 12/4633
370/392

(Continued)

FOREIGN PATENT DOCUMENTS

EP    1672834 A1    6/2006
WO    2016018181 A1    2/2016

OTHER PUBLICATIONS

Non-Final Office Action for U.S. Appl. No. 15/329,955, dated Jul. 9, 2018, 23 pages.

(Continued)

*Primary Examiner* — Huy D Vu
*Assistant Examiner* — Bailor C. Hsu
(74) *Attorney, Agent, or Firm* — Withrow & Terranova, PLLC

(57) ABSTRACT

Mechanisms for path continuity determination in an aggregate flow environment. An ingress node and a downstream node for which a path continuity check is desired are determined. The ingress node devolves, from an aggregate flow entry, one or more microflows that comprise packets which are destined for the downstream node. The downstream node is directed to generate corresponding microflows. Each microflow is associated with a continuity set identifier and has one or more timers, such as an idle timer and/or a hard timeout timer. Upon timeout of one of the timers, the ingress node and the downstream node send a microflow termination message that contains the continuity set identifier to a controller node. The controller node determines a path continuity status between the ingress node and the downstream node based on a receipt of one or more microflow termination messages from the ingress node and the downstream node.

14 Claims, 15 Drawing Sheets

(56) References Cited

U.S. PATENT DOCUMENTS

| | | | |
|---|---|---|---|
| 7,012,919 B1* | 3/2006 | So | H04L 41/5019 |
| | | | 370/235 |
| 8,848,718 B2* | 9/2014 | Hussain | H04L 43/026 |
| | | | 370/352 |
| 8,868,775 B2* | 10/2014 | Filsfils | H04L 45/00 |
| | | | 370/230.1 |
| 9,363,180 B2* | 6/2016 | Beliveau | H04L 45/38 |
| 9,686,185 B2* | 6/2017 | Shelly | H04L 45/38 |
| 9,973,445 B2 | 5/2018 | Zhang et al. | |
| 2003/0037042 A1 | 2/2003 | Kametani | |
| 2010/0158009 A1* | 6/2010 | Lee | H04L 47/2441 |
| | | | 370/392 |
| 2013/0064079 A1 | 3/2013 | Zhang | |
| 2014/0112187 A1 | 4/2014 | Kang et al. | |
| 2015/0036498 A1 | 2/2015 | Ehara | |

OTHER PUBLICATIONS

Mogul, Jeffrey C. et al., "DevoFlow: Cost-Effective Flow Management for High Performance Enterprise Networks," Proceedings of the 9th ACM SIGCOMM Workshop on Hot Topics in Networks (Hotnets), Article No. 1, Oct. 20-21, 2010, Monterey, California, ACM, 6 pages.
Author Unknown, "SDN architecture," Issue 1.1, 2016, Open Networking Foundation, pp. 1-59.
Hong, James Won-Ki, "Tu18: Internet Traffic Monitoring and Analysis: Methods and Applications," IEEE Global Telecommunications Conference (GLOBECOM), Nov. 29-Dec. 3, 2004, Dallas, Texas, USA, IEEE, 63 pages.
Extended European Search Report for European Patent Application No. 17163991.7, dated Sep. 26, 2017, 8 pages.
Author Unknown, "OpenFlow Switch Specification," ONF TS-007, Version 1.3.1, Sep. 6, 2012, Open Networking Foundation, pp. 1-128.
Author Unknown, "OpenFlow Switch Specification," ONF TS-012, Version 1.4.0, Oct. 14, 2013, Open Networking Foundation, pp. 1-206.
Barford, Paul, et al., "Comparing Probe- and Router-Based Packet-Loss Measurement," IEEE Internet Computing, vol. 8, Issue 5, Sep.-Oct. 2004, IEEE, pp. 2-8.
Casado, Martin, et al., "Fabric: A Retrospective on Evolving SDN," Proceedings of the first workshop on Hot topics in software defined networks (HotSDN'12), Aug. 13, 2012, Helsinki, Finland, ACM, 5 pages.
Castrucci, Marco, et al., "Extension of the OpenFlow framework to foster the Software Defined Network paradigm in the Future Internet," GARR Conference, Nov. 8-10, 2011, Bologna, Italy, Publisher Unknown, 12 pages.
Curtis, Andrew R., et al., "DevoFlow: Scaling Flow Management for High-Performance Networks," Proceedings of the ACM SIGCOMM 2011 conference (SIGCOMM'11), Aug. 15-19, 2011, Toronto, Ontario, Canada, ACM, 12 pages.
Gourov, Vassil Nikolaev, "Network Monitoring with Software Defined Networking: Towards OpenFlow network monitoring," Master of Science Thesis, Delft University of Technology, Aug. 30, 2013, Vassil Nikolaev Gourov, 75 pages.
John, Wolfgang, et al., "Low-overhead packet loss and one-way delay measurements in Service Provider SDN," Open Networking Summit 2014: Research Track, Mar. 2-4, 2014, Santa Clara, California, USENIX, 2 pages.
Katz, Dave, et al., "Bidirectional Forwarding Detection (BFD)," Internet Engineering Task Force (IETF), Request for Comments: 5880, Category: Standards Track, Jun. 2010, IETF Trust, pp. 1-49.
Khurshid, Ahmed, et al., "VeriFlow: Verifying Network-Wide Invariants in Real Time," 10th USENIX Symposium on Networked Systems Design and Implementation (NSDI '13), Apr. 2-5, 2013, Lombard, Illinois, USENIX Association, pp. 15-27.
Mattos, Diogo M. F., et al., "OMNI: OpenFlow MaNagement Infrastructure," International Conference on the Network of the Future (NOF), Nov. 28-30, 2011, IEEE, 5 pages.
Narayana, Srinivas, et al., "Compiling Path Queries," Proceedings of the 13th USENIX Symposium on Networked Systems Design and Implementation (NSDI '16), Mar. 16-18, 2016, Santa Clara, California, USENIX Association, 17 pages.
Narayana, Srinivas, et al., "Compiling Path Queries in Software-Defined Networks," Proceedings of the third workshop on Hot topics in software defined networking (HotSDN'14), Aug. 22, 2014, Chicago, Illinois, ACM, 6 pages.
Reitblatt, Mark, et al., "Consistent Updates for Software-Defined Networks: Change You Can Believe In!" Proceedings of the Twelfth ACM Workshop on Hot Topics in Networks (Hotnets '11), Nov. 14-15, 2011, Cambridge, Massachusetts, ACM, 6 pages.
Yiakoumis, Yiannis, et al., "Dynamic Flow Aggregation on an OpenFlow Network," Stanford University, Date Unknown, archive.openflow.org/wk/images/4/49/OpenFlow-Sigcomm-Aggregation.pdf, NSF, Cisco, Deutsche Telekom, DoCoMo, Ericsson, NEC and Xilinx, 1 page.
Yu, Curtis, et al., "FlowSense: Monitoring Network Utilization with Zero Measurement Cost," Proceedings of the 14th international conference on Passive and Active Measurement (PAM'13), Mar. 18-19, 2013, Hong Kong, China, Springer-Verlag, 10 pages.
International Search Report and Written Opinion for International Patent Application No. PCT/SE2014/050909, dated Feb. 16, 2015, 9 pages.
Examination Report for European Patent Application No. 17163991.7, dated Jul. 30, 2018, 5 pages.
Notice of Allowance for U.S. Appl. No. 15/329,955, dated Dec. 4, 2018, 8 pages.
Examination Report for European Patent Application No. 17163991.7, dated Feb. 25, 2019, 5 pages.
Corrected Notice of Allowability for US. Appl. No. 15/329,955, dated Jan. 24, 2019, 5 pages.
Corrected Notice of Allowability for US. Appl. No. 15/329,955, dated Mar. 11, 2019, 5 pages.

* cited by examiner

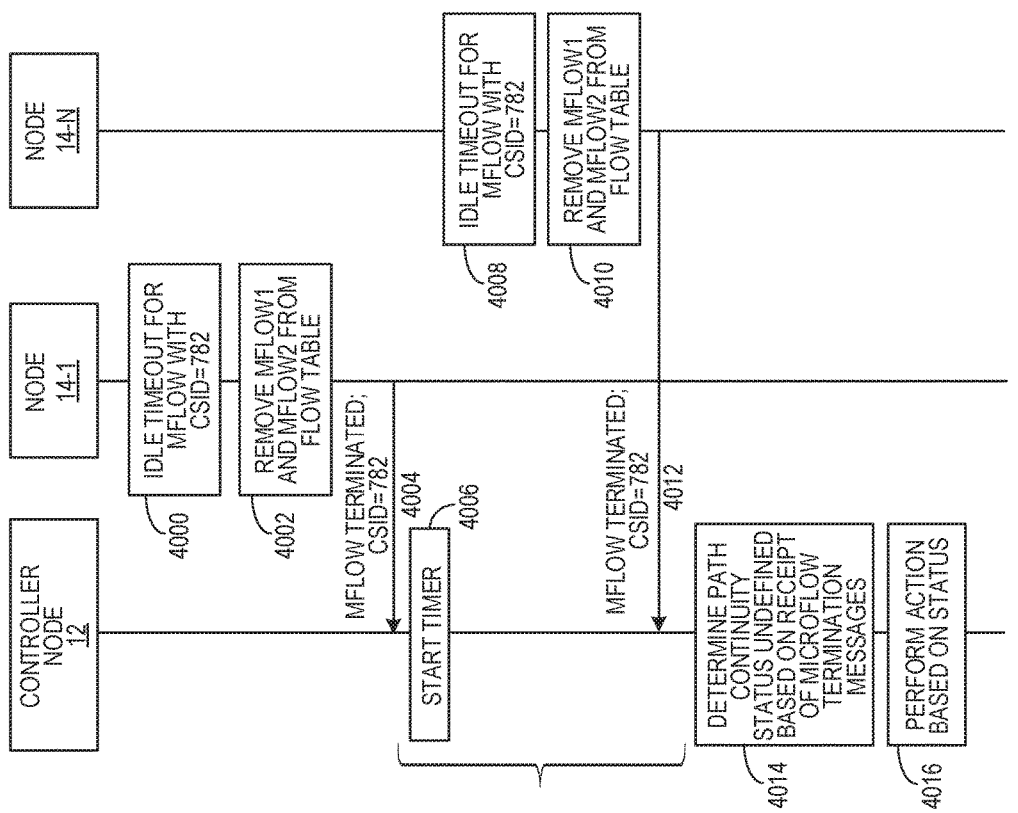
FIG. 6B1

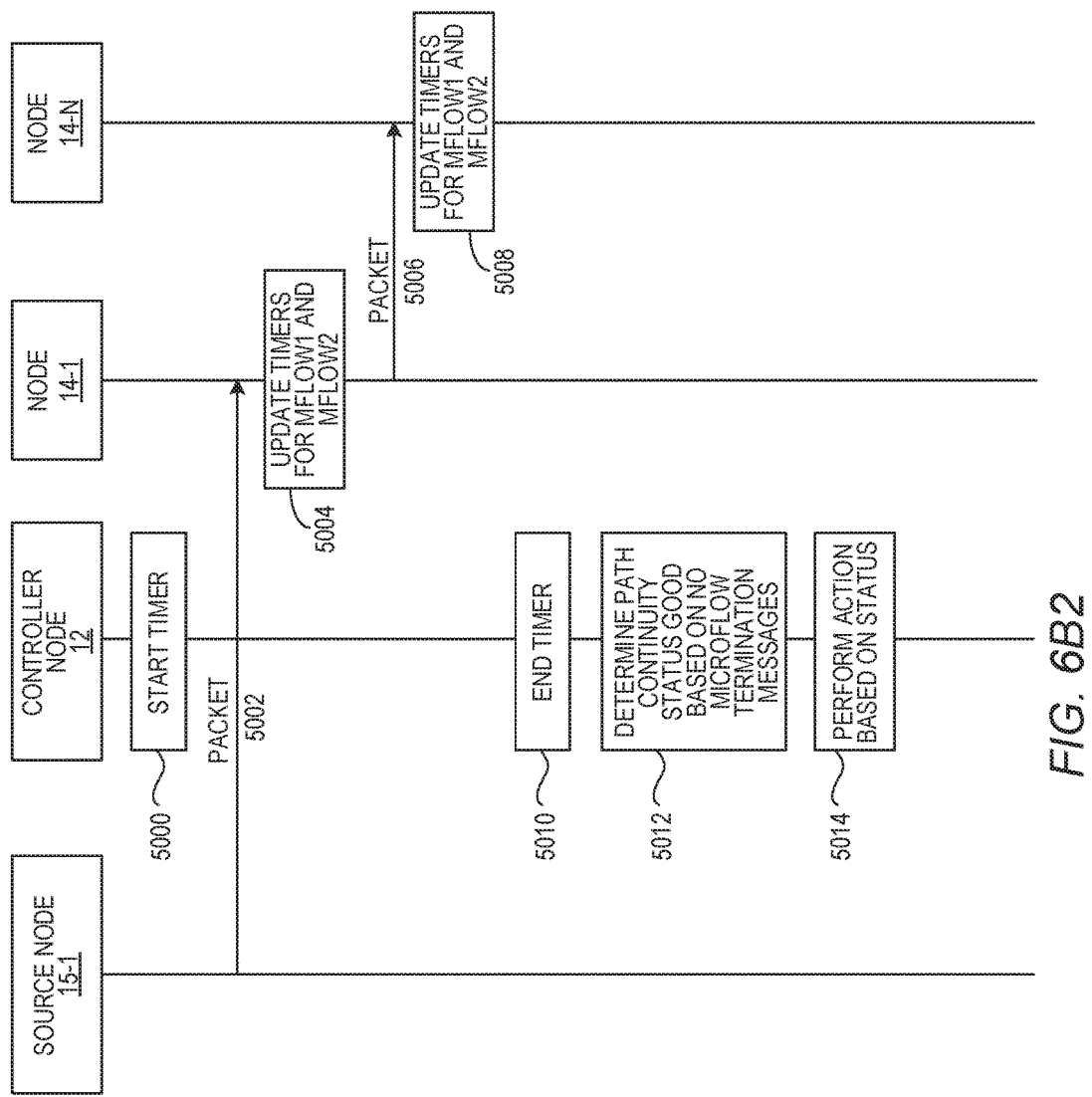
FIG. 6B2

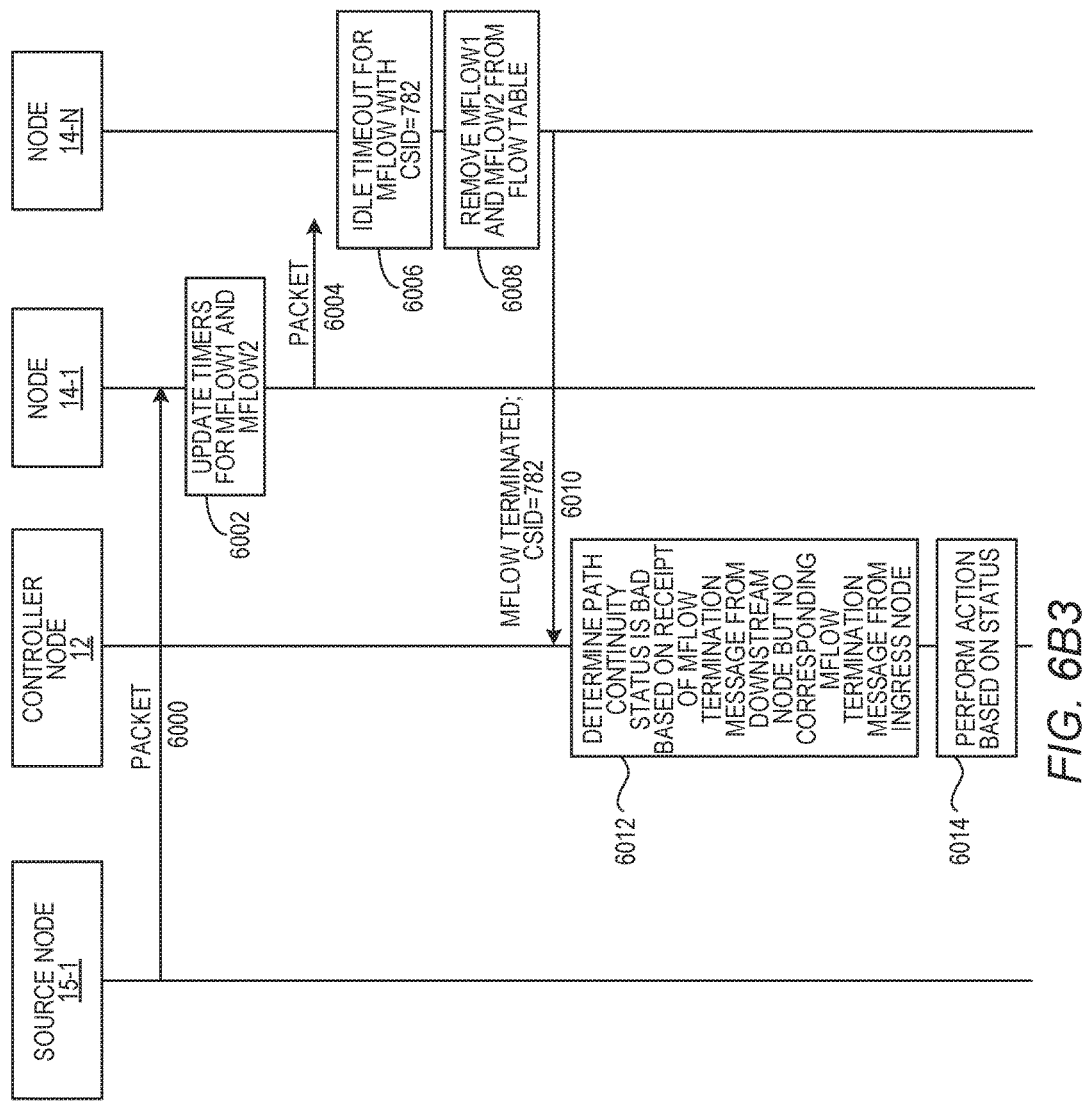
FIG. 6B3

PATH CONTINUITY DETERMINATION IN AN AGGREGATE FLOW ENVIRONMENT

TECHNICAL FIELD

The embodiments relate generally to mechanisms for determining path continuity between two nodes in a network environment that utilizes aggregate flow entries to forward packets.

BACKGROUND

There is increasing interest in moving control and intelligence from individual switching, routing, and bridging network nodes to a fewer number of controller nodes. Such networking architectures will be referred to herein generally as centralized control plane networking architectures (CCPNAs) and are exemplified, for example, by a software-defined network (SDN). An SDN is one example of a network architecture wherein a forwarding plane (sometimes referred to as a data plane) and a control plane, which are conventionally implemented in a single network node, are separated and implemented in two distinct network nodes. Such distinct network nodes may be referred to as a datapath node and a controller node, respectively. An example of an SDN architecture, or specification, is the OpenFlow Switch Specification, version 1.4(OpenFlow).

Theoretically, by separating the forwarding function and the control function into different network nodes, multiple relatively inexpensive datapath nodes may be coupled together and controlled by a single controller node, resulting in a lower overall network cost. Another potential advantage of a CCPNA is that a single controller node can be more easily programmed to implement new network functionality than would be possible by programming multiple conventional network nodes that combine the control plane and the forwarding plane, thereby simplifying the implementation of additional networking functions in the network.

When a new flow between a source node and a destination node is originated in a CCPNA, an ingress datapath node typically informs the controller node about the new flow so that a path through the network may be determined. The controller node determines an appropriate path through the network, and the controller node then sends packet-forwarding commands to the datapath nodes in the path so that each datapath node can install a flow entry into a flow table that pertains to the new flow, and indicates where packets associated with the new flow are to be forwarded. This path setup process takes time, relatively substantial controller node processing, and network bandwidth, but provides high-granularity routing through the network.

In some environments however, such as a service provider environment, the number of new flows that are continually initiated may be prohibitive to setup individually. To solve this problem, the datapath nodes may utilize one or more wildcard, sometimes referred to as aggregate, flow entries that group, or aggregate, what could be identified as many separate flows into a single flow entry. For example, an aggregate flow entry may direct that any flow initiated from any media access control (MAC) address, and/or which are destined for any MAC address, be forwarded through a certain port of the datapath node, without a need to communicate with the controller node.

Aggregate flow entries thus reduce communications between an ingress datapath node and a controller node and reduce the processing requirements of the controller node, but at a loss of flow granularity. The loss of flow granularity can be undesirable however, for other purposes, such as when measuring certain path characteristics, such as, by way of non-limiting example, path continuity between two datapath nodes. Determining path continuity between two datapath nodes may become difficult or impossible at a desired level of granularity when multiple independent flows are aggregated together. For example, because each datapath node in a network may have different aggregate flow entries, as well as different non-aggregate flow entries, some flows that are part of an aggregate flow at an ingress datapath node may be split off from the aggregate flow prior to an aggregate flow entry at an egress datapath node, rendering it difficult or impossible to determine continuity between any two specific datapath nodes.

One solution to this problem is an active measurement mechanism that injects trains of probe packets between two specified datapath nodes. However, such active measurement mechanisms increase traffic on the network, and require that at least some of the datapath nodes include active measurement functionality.

Another solution actively examines flow tables of datapath nodes on a continuous basis. However, this may substantially increase controller node overhead.

SUMMARY

The embodiments implement mechanisms for path continuity determination in an aggregate flow environment. An ingress node and a downstream node for which a path continuity check is desired are determined. A continuity set identifier is associated with the path continuity check. The ingress node devolves, from an aggregate flow entry, one or more microflows that comprise packets which are destined for the downstream node. The downstream node is directed to generate corresponding microflows. Each microflow is associated with the continuity set identifier and has one or more timers, such as an idle timer and/or a hard timeout timer. Upon timeout of one of the timers, the ingress node and the downstream node remove each microflow that is associated with the continuity set identifier, and send only one microflow termination message that contains the continuity set identifier to a controller node. The controller node determines a path continuity status between the ingress node and the downstream node based on a receipt of one or more microflow termination messages from the ingress node and the downstream node. Among other advantages, the embodiments utilize existing network traffic to determine path continuity checks between two nodes, eliminating a need to insert probe packets onto a network that utilize valuable network bandwidth. Moreover, the use of existing network traffic eliminates a need to utilize standardized nodes on a network that each have customized functionality designed to recognize special packets for path continuity check purposes.

In one embodiment, a method for generating a microflow is provided. An ingress node receives a first packet having first header information that matches an aggregate flow entry in a flow table. It is determined that a devolve action is associated with the aggregate flow entry, the devolve action having an associated idle timeout value. A continuity set identifier that is associated with the devolve action is determined. Based on determining that the devolve action is associated with the aggregate flow entry, a first microflow flow entry is generated in the flow table to define a first microflow. The first microflow flow entry includes the continuity set identifier and a first idle timer based on the idle timeout value. It is determined that a timer associated with the first microflow flow entry has timed out. In response to determining that the timer has timed out, a controller node is sent a microflow termination message that comprises the continuity set identifier.

In another embodiment, a method performed by a controller node is provided. The controller node sends, to an ingress node, data that establishes a devolve action in association with an aggregate flow entry at the ingress node, the data including an idle timeout value. The controller node receives from the ingress node microflow generation information that identifies a new microflow associated with the devolve action. A continuity set identifier that is associated with the new microflow is determined. A downstream node to which the new microflow will be forwarded is determined. A path continuity status between the ingress node and the downstream node is determined based on a receipt of one or more microflow termination messages from the ingress node and the downstream node.

In another embodiment, a controller node is provided. The controller node includes a transceiver configured to communicate with a network, and a processor device coupled to the transceiver. The processor device is configured to send data that establishes a devolve action in association with an aggregate flow entry at an ingress node. The data includes an idle timeout value. The processor device is further configured to receive, from the ingress node, microflow generation information that identifies a new microflow associated with the devolve action and to determine a continuity set identifier that is associated with the new microflow. The processor is also configured to determine a downstream node to which the new microflow will be forwarded. The processor is configured to determine a path continuity status between the ingress node and the downstream node based on a receipt of one or more microflow termination messages from the ingress node and the downstream node.

In another embodiment, a datapath node is provided. The datapath node includes a transceiver configured to communicate with a network and a processor device coupled to the transceiver. The processor device is configured to receive a first packet having first header information that matches an aggregate flow entry in a flow table. The processor device is further configured to determine that a devolve action is associated with the aggregate flow entry. The devolve action has an associated idle timeout value. The processor device is further configured to determine a continuity set identifier that is associated with the devolve action. The processor device is also configured to, based on determining that the devolve action is associated with the aggregate flow entry, generate a first microflow flow entry in the flow table to define a first microflow. The first microflow flow entry includes the continuity set identifier and a first idle timer based on the idle timeout value. The processor device is also configured to determine that a timer associated with the first microflow flow entry has timed out, and, in response to determining that the timer has timed out, send a controller node a microflow termination message that comprises the continuity set identifier.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 6B1-6B3 are message flow diagrams illustrating a controller node determining a path continuity status between an ingress node and a downstream node based on three different alternative situations after the sequence of actions discussed above with regard to FIG. 6A;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first packet" and "second packet," and does not imply a priority, a type, an importance, or other attribute, unless otherwise stated herein.

As used herein and in the claims, the articles "a" and "an" in reference to an element refers to "one or more" of the element unless otherwise explicitly specified.

Figure 1:
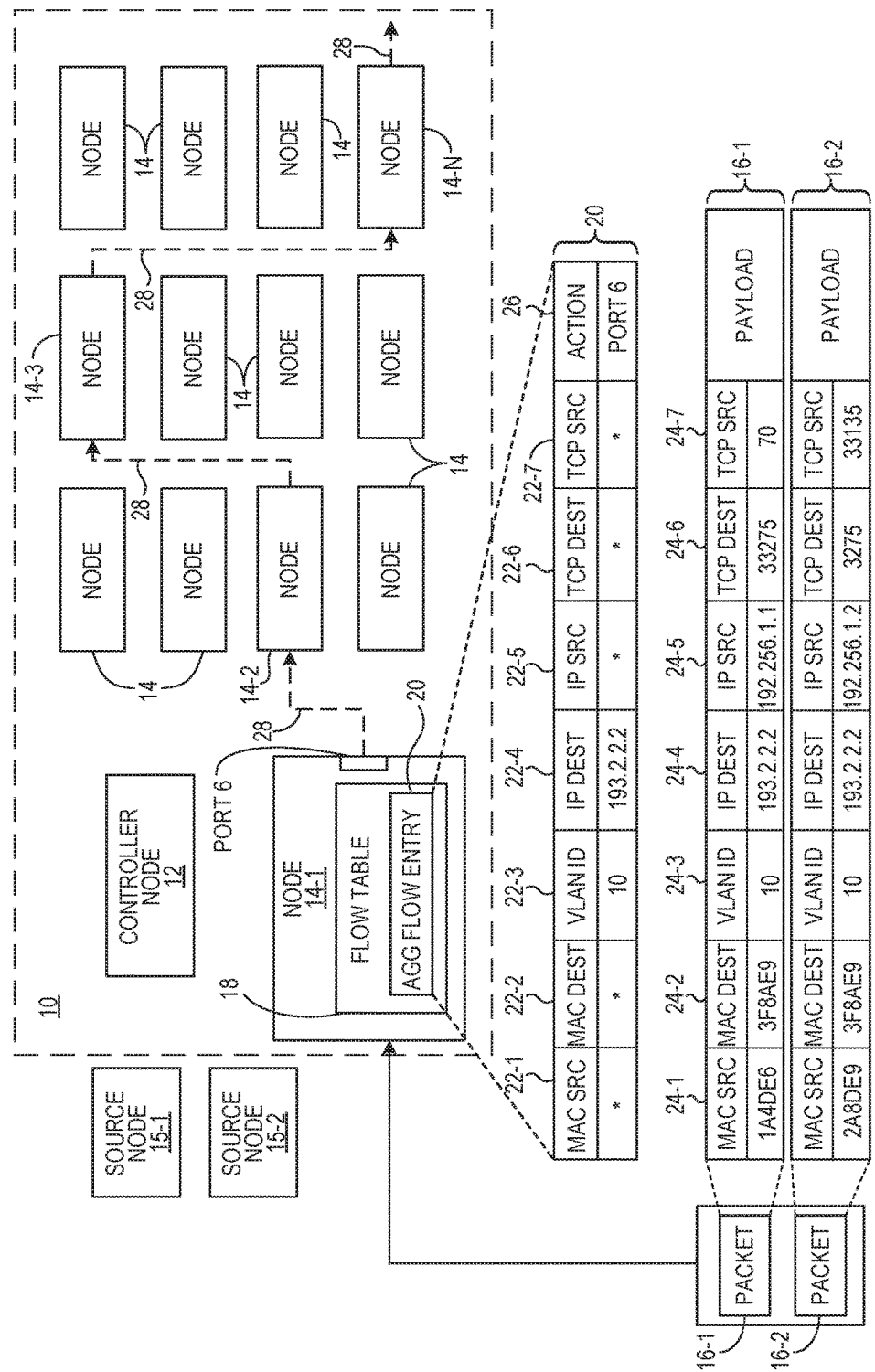
FIG. 1 is a block diagram of a network that has a centralized control plane networking architecture (CCPNA), wherein one or more controller nodes operate in conjunction with multiple datapath nodes to forward packets through the network.

The embodiments implement mechanisms for path continuity determination in an aggregate flow environment. FIG. 1 is a block diagram of a network 10 that has a centralized control plane networking architecture (CCPNA), wherein one or more controller nodes 12 (only one controller node 12 is illustrated for simplicity) operate in conjunction with multiple datapath nodes 14, 14-1-14-N (generally, "nodes 14") to forward packets through the network 10. Although not shown for clarity purposes, the nodes 14 and the controller node 12 are communicatively coupled to one another, directly or indirectly, to facilitate communications with one another, and for purposes of routing packets through the nodes 14.

Generally, the controller node 12 includes control plane functionality, which may include, for example, path determination, Operation, Administration and Maintenance (OAM) functions, and the like. By way of non-limiting example, the controller node 12 may comprise a computing device that implements the Open Daylight platform, or may comprise a NOX OpenFlow controller, a Floodlight Open software-defined network (SDN) controller, an Ericsson® SDN controller, or the like. The nodes 14 include forwarding plane functionality and, once properly programmed as discussed in greater detail herein, forward packets that arrive at an ingress node 14 through the network 10 to an egress node 14. By way of non-limiting example, the nodes 14 may comprise any computing device that implements a SDN control protocol, such as OpenFlow or the like, such as an Open vSwitch node.

Any node 14 that is capable of receiving a packet from a source node 15-1, 15-2 (generally, "source nodes 15") outside of the network 10 may be an ingress node 14. A particular source node 15 outside of the network 10 may be a node in another network, or may be an originating node that originally generated the packet. Any node 14 that is capable of sending a packet to a node outside of the network 10 may be an egress node 14. The node outside of the network 10 may be a node in another network that further forwards the packet, or may be a destination node that consumes the packet. In the embodiments discussed herein, solely for purposes of illustration, the node 14-1 will be discussed as being an ingress node with respect to packets 16-1-16-2 (generally, "packets 16"), and the node 14-N will be referred to as an egress node with respect to such packets 16. However, in some networks any of the nodes 14 may be an ingress node 14 with respect to some packets, an egress node 14 with respect to other packets, or a node 14 in a path of nodes 14 between an ingress node 14 and an egress node 14 with respect to still other packets.

For purposes of illustration, the network 10 may be discussed in the context of a SDN that adheres to one or more of the OpenFlow Switch Specifications, but the embodiments are not limited to an SDN network, and have applicability in any network implementation or architecture in which control is, or may be, centralized in one or more controller nodes, such as the controller node 12, and in which other nodes, such as the nodes 14, are responsible for forwarding packets through the network 10. In particular, the embodiments have applicability in the context of Open vSwitch Database Management Protocol (OVSDB) and OpenDaylight networks, as well as networks that utilize a combination of Network Configuration Protocol (NETCONF) and Simple Network Management Protocol (SNMP).

Solely for purposes of illustration, the embodiments will be discussed in conjunction with the source node 15-1 sending the packet 16-1 to the ingress node 14-1, and the source node 15-2 sending the packet 16-2 to the ingress node 14-1. When the packet 16-1 is received by the ingress node 14-1, the ingress node 14-1 accesses a flow table 18 that contains one or more flow entries 20, and attempts to match the values contained in data fields 22-1-22-7 (generally, "data fields 22") of the flow entry 20 with header information contained in corresponding header fields 24-1-24-7 (generally, "header fields 24") of the packet 16-1. It should be noted that certain data fields 22 have been illustrated for purposes of discussion, but the data fields 22 may comprise any one or more fields of data that would be contained in the header of a particular packet being forwarded by the respective network.

One or more data fields 22 in the flow entry 20 may contain a wildcard designation that indicates any value contained within the corresponding header field 24 of a packet 16 will constitute a match, irrespective of the actual value. The designation may be any suitable indicator, and is illustrated in the figures discussed herein as an asterisk ("*"), as shown in the data fields 22-1, 22-2, 22-5-22-7. A flow entry 20 that contains such a data field 22 may be referred to herein as an aggregate flow entry 20, or a wildcard flow entry 20, because multiple different flows may match against such a data field 22, and thus result in an aggregate flow. Once the ingress node 14-1 determines that the values of the header fields 24 match the values of a flow entry 20, the ingress node 14-1 then performs the action or actions identified in an action field 26 of the flow entry 20. In this example, the action field 26 directs the ingress node 14-1 to forward the packet 16-1 via a port 6, which in this example is communicatively coupled to the node 14-2. Each other node 14 will also have one or more flow tables 18, and flow entries 20, and in this example the packet 16-1 will follow a path 28 through the network 10 that includes the ingress node 14-1, intermediate nodes 14-2, 14-3, and egress node 14-N. The egress node 14-N then forwards the packet 16-1 out of the network 10 to another node, such as a node in another network, or a destination node that consumes the packet 16-1.

Any additional packets 16, such as the packet 16-2, which are processed by the ingress node 14-1 and have values in the header fields 24 of such packets 16 that match the data fields 22 of the flow entry 20, will likewise be forwarded to the node 14-2 via the port 6. Thus, from the perspective of the ingress node 14-1, even though the packets 16-1, 16-2 each have different values in the header fields 24-1, 24-5-24-7, each of such packets 16 will be forwarded according to the flow entry 20, and are thus seen by the ingress node 14-1 as a single flow. Each of such packets 16 may also be similarly forwarded along the path 28, or, one or more of such packets 16 may be forwarded differently by a downstream node 14 such that a particular packet 16 takes a different path than that of the packet 16-1. For example, the node 14-2 may have an aggregate flow entry in a flow table 18 (not illustrated) that further forwards received packets 16 based on a different criteria than that of the flow entry 20.

Figure 2A:
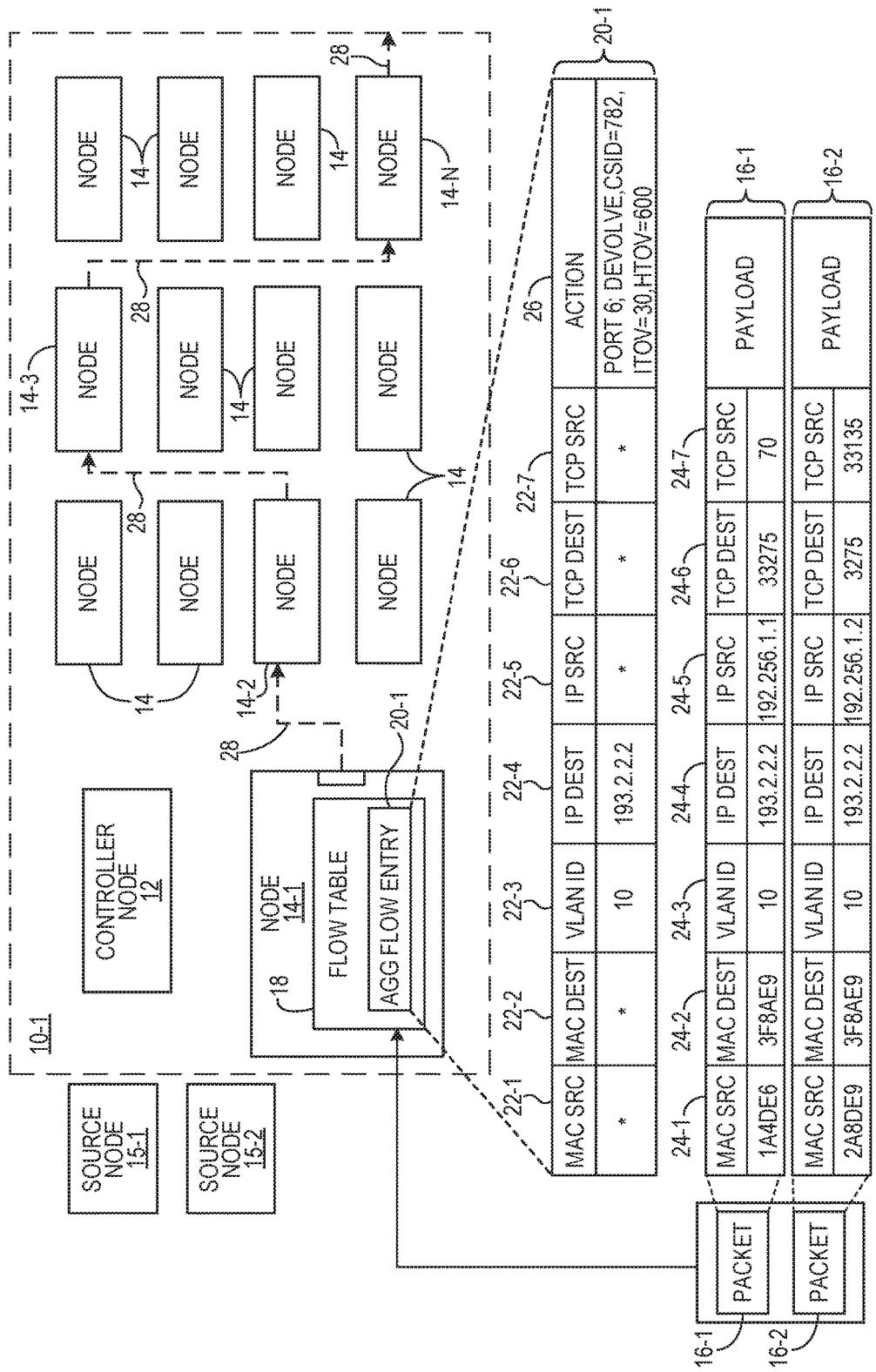
FIGS. 2A-2D are block diagrams of a network illustrating the generation of a plurality of microflows according to one embodiment.

FIG. 2A is a block diagram of a network 10-1 according to one embodiment. The network 10-1 is substantially similar to the network 10 illustrated in FIG. 1, except as otherwise discussed herein. In this embodiment, the action field 26 in an aggregate flow entry 20-1 includes a devolve action. The devolve action indicates to the ingress node 14-1 that additional flow entries 20 are to be generated in the flow table 18 for new flows that meet the criteria of the aggregate flow entry 20-1.

The devolve action also includes information that is to be associated with such devolved flow entries 20. In this example, the devolve action includes a continuity set identifier ("CSID") of 782, an idle timeout value ("ITOV") of 30seconds, and a hard timeout value ("HTOV") of 600 seconds, each of which will be discussed in greater detail below. The aggregate flow entry 20-1 and the devolve action may have been configured into the ingress node 14-1 by the controller node 12, either automatically based on a process executing on the controller node 12, or in response to operator input at the controller node 12.

The aggregate flow entry 20-1 and the devolve action may have been configured into the ingress node 14-1 at the same time, or at different times. In this example, the ingress node 14-1 processes the packet 16-1 and determines that the values of the header fields 24 of the packet 16-1 match the values in the data fields 22 of the aggregate flow entry 20-1, some by virtue of wildcard designations. The ingress node 14-1 determines that the action field 26 identifies the devolve action. Based on the devolve action associated with the aggregate flow entry 20-1, the ingress node 14-1 then generates a new flow, sometimes referred to herein as a microflow, based on the values in the header fields 24 of the packet 16-1.

Figure 2B:
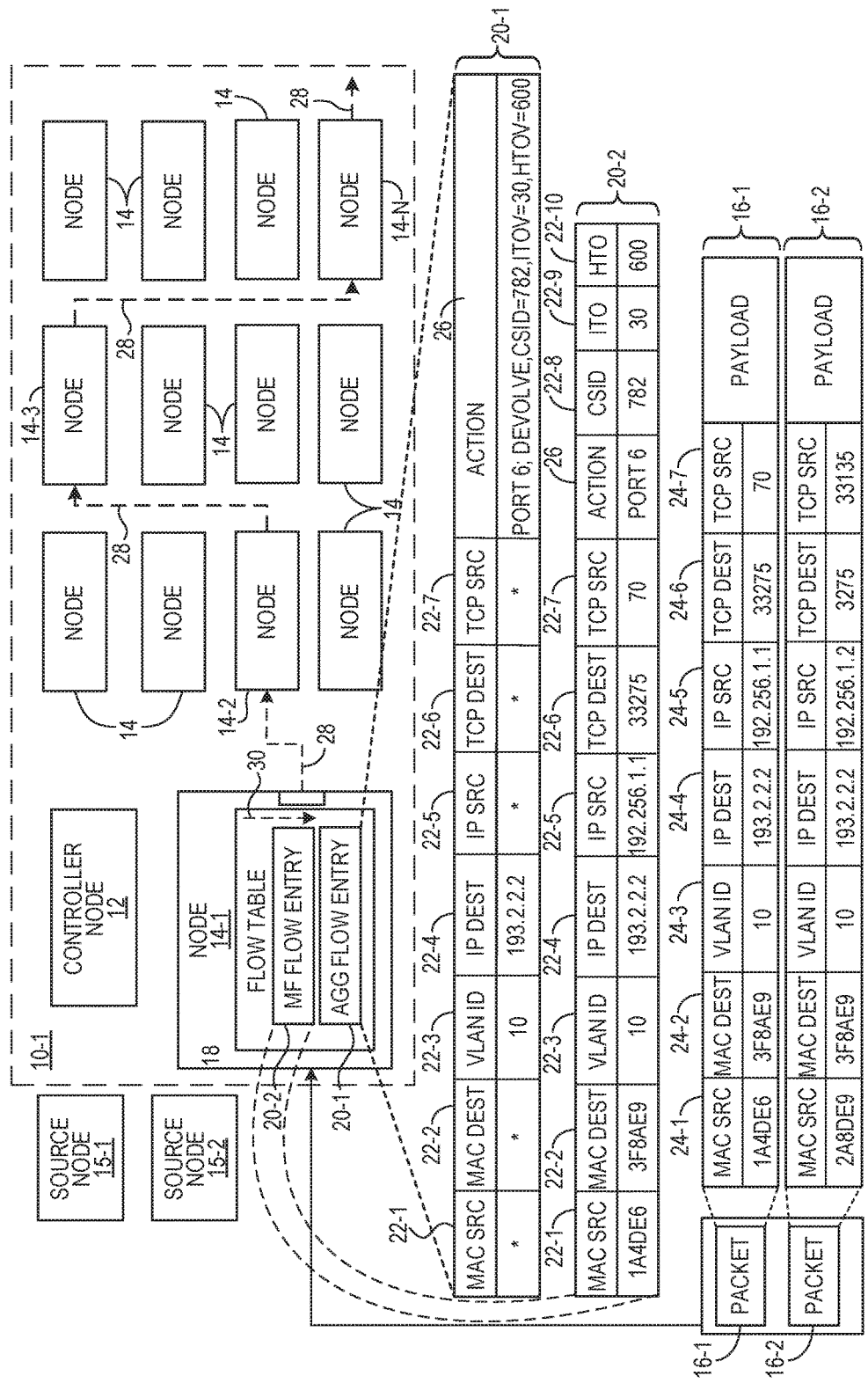

FIG. 2B is a block diagram of the network 10-1 illustrated in FIG. 2A after the ingress node 14-1 has generated a new microflow based on the devolve action in the action field 26 and the header fields 24 of the packet 16-1. In particular, the ingress node 14-1 generates a new microflow (MF) flow entry 20-2 that contains a plurality of data fields 22-1-22-7 that contain values extracted from corresponding header fields 24 of the packet 16-1, as well as a data field 22-8 that identifies the continuity set ID of 782, a data field 22-9 that maintains an idle timeout timer ("ITO") that has an initial value equal to the idle timeout value of 30, and a data field 22-10 that maintains a hard timeout timer ("HTO") that has an initial value equal to the hard timeout value of 600. The ingress node 14-1 gives the microflow flow entry 20-2 a higher flow matching priority 30 than that of the aggregate flow entry 20-1. The higher flow matching priority 30 ensures that when the ingress node 14-1 processes future packets 16, the microflow flow entry 20-2 is matched against the header fields 24 of the packet 16 before the aggregate flow entry 20-1. As will be discussed in greater detail herein, at some point in time, the ingress node 14-1 may also send the controller node 12 a microflow generation message that includes microflow generation information regarding the newly generated microflow, including, by way of non-limiting example, the values contained in the data fields 22 of the microflow flow entry 20-2.

The embodiments utilize devolved microflows, such as the microflow defined by the microflow flow entry 20-2, to determine path continuity between an ingress node 14, such as the ingress node 14-1, and a downstream node 14. In one embodiment, after a devolved microflow is installed on the ingress node 14-1, the corresponding downstream node 14 is directed to install the same devolved microflow with the same continuity set ID, idle timeout timer, and hard timeout timer as the microflow flow entry 20-2. Over time, both the ingress node 14-1 and the downstream node 14 may devolve multiple microflows for the same continuity set ID, each of which will have the same idle timeout timer and hard timeout timer. When the ingress node 14-1 and the downstream node 14 receive a packet associated with a microflow, the idle timeout timers of all microflows that have the same continuity set ID as the continuity set ID of the microflow with which the packet is associated are reset to the idle timeout value on the respective node 14. When a microflow generated by the ingress node 14-1 times out, the ingress node 14-1 removes all microflows having the same continuity set ID of the microflow that timed out. The ingress node 14-1 sends a single microflow termination message that contains the continuity set ID to the controller node 12, irrespective of how many microflows were generated with that particular continuity set ID. The downstream node 14 operates similarly. The controller node 12 receives the microflow termination messages that contain the continuity set IDs, and, as discussed in greater detail herein, based on such microflow termination messages determines a path continuity status between the ingress node 14-1 and the downstream node 14.

Referring again to FIG. 2B, the ingress node 14-1 ultimately forwards the packet 16-1 via the port 6 to the node 14-2 in the path 28. The ingress node 14-1 then processes the next packet 16-2 to arrive at the ingress node 14-1. The ingress node 14-1 accesses the microflow flow entry 20-2 by virtue of its higher flow matching priority 30 than that of the aggregate flow entry 20-1, and attempts to match the header fields 24 of the packet 16-2 against the data fields 22 of the microflow flow entry 20-2. The packet 16-2 is not a match because the values in the header fields 24-1, 24-5-24-7 of the packet 16-2 do not match the values in the data fields 22-1, 22-5-22-7 of the microflow flow entry 20-2. The ingress node 14-1 accesses the aggregate flow entry 20-1 and attempts to match the header fields 24 of the packet 16-2 against the data fields 22 of the aggregate flow entry 20-1. Because the values in the header fields 24 match the values in the corresponding data fields 22 of the aggregate flow entry 20-1, some by virtue of wildcard designations, the ingress node 14-1 determines that the packet 16-2 matches the aggregate flow entry 20-1.

Figure 2C:
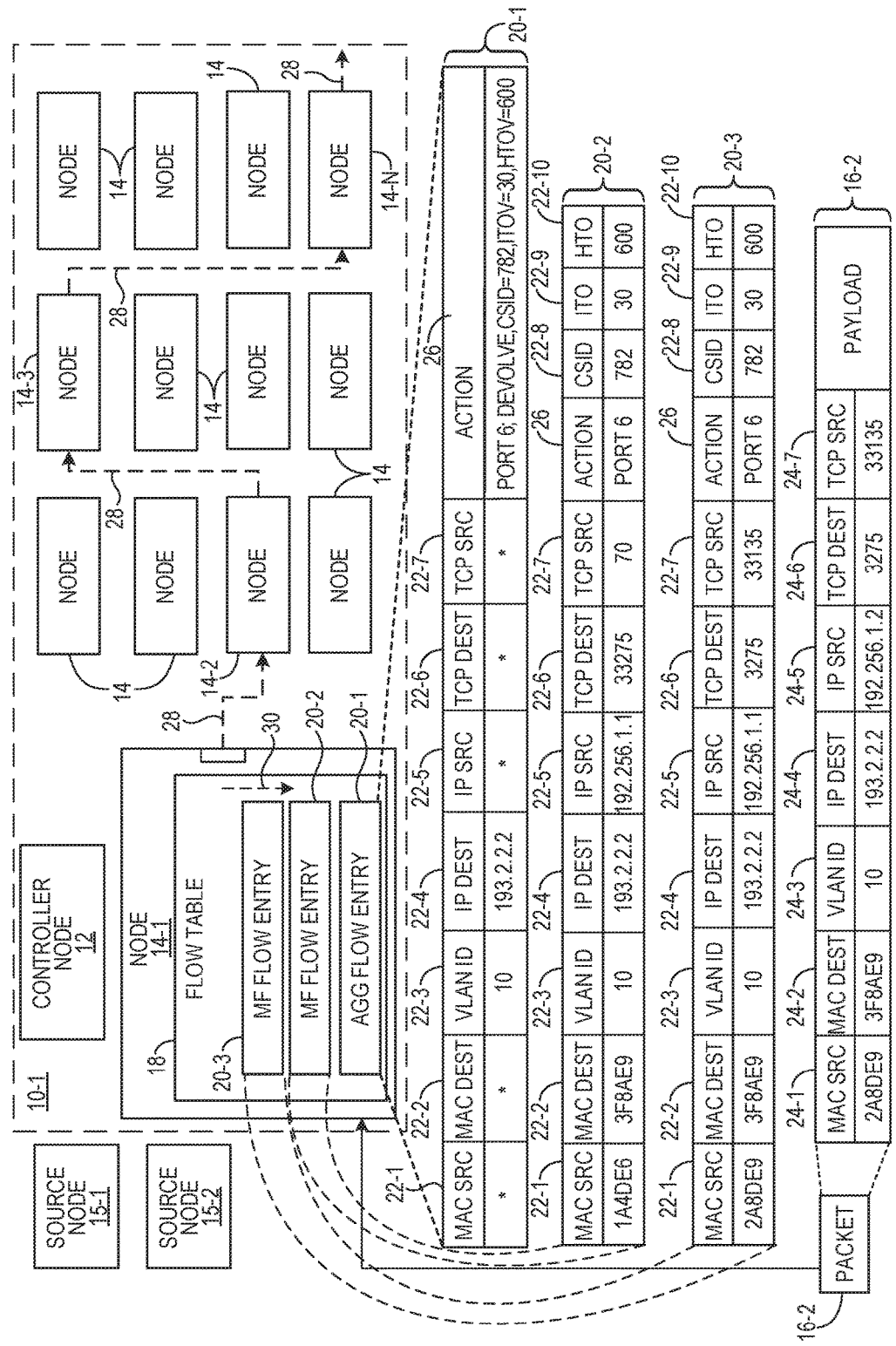

FIG. 2C is a block diagram of the network 10-1 illustrated in FIGS. 2A-2B after the ingress node 14-1 has generated a new microflow based on the devolve action in the action field 26 and the header fields 24 of the packet 16-2. The ingress node 14-1 repeats the process described above with regard to the packet 16-1 and generates a new microflow flow entry 20-3 in the flow table 18 based on the header fields 24 of the packet 16-2 and the devolve action. The data fields 22-8-22-10 contain the same continuity set ID, idle timeout timer and hard timeout timer as the microflow flow entry 20-2.

Figure 2D:
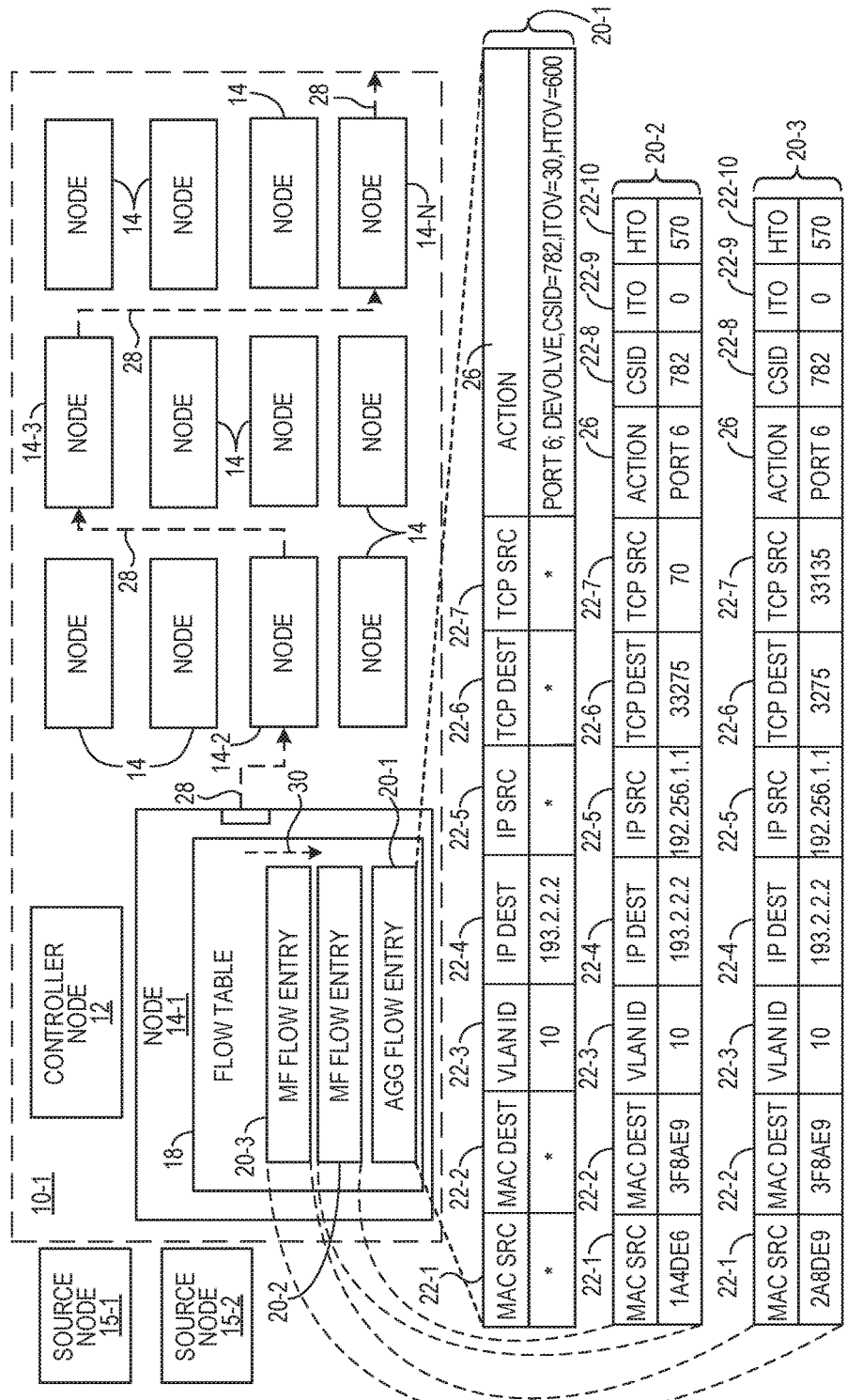

FIG. 2D is a block diagram of the network 10-1 illustrated in FIGS. 2A-2C illustrating an idle timeout situation. In particular, the idle timers of the microflows defined by the microflow flow entries 20-2-20-3 have gone to zero. In this situation, the ingress node 14-1 will remove each microflow flow entry 20 that has the same continuity set ID from the flow table 18. In this example, the ingress node 14-1 will remove the two microflow flow entries 20-2-20-3 from the flow table 18. The ingress node 14-1 then sends the controller node 12 only one microflow termination message that contains the continuity set ID. As will be discussed in greater detail below, the reception of zero or more microflow termination messages by the controller node 12 allows the controller node 12 to determine the path continuity status of the path between an ingress node 14 and a downstream node 14.

Figure 3:
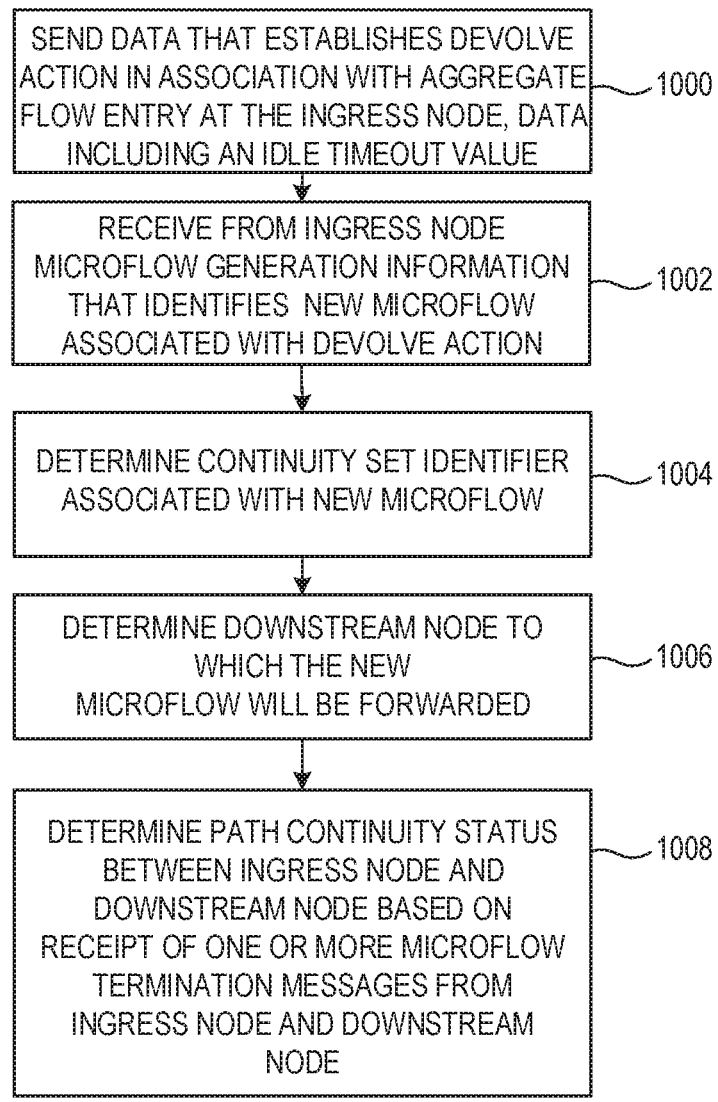
FIG. 3 is a flowchart of a method for determining a path continuity status between an ingress node and a downstream node according to one embodiment.

FIG. 3 is a flowchart of a method for determining a path continuity status between an ingress node 14 and a downstream node 14 according to one embodiment. FIG. 3 will be discussed in conjunction with FIGS. 2A-2D. In this example, assume that the controller node 12 is to determine a path continuity status between the ingress node 14-1, and a downstream egress node 14-N (sometimes referred to herein as "downstream node 14-N" for purposes of brevity). The controller node 12 may initially send data that establishes the devolve action in association with the aggregate flow entry 20-1 maintained at the ingress node 14-1 (block 1000). The data establishing the devolve action may be sent in conjunction with data establishing the aggregate flow entry 20-1, or may be sent subsequent to the establishment of the aggregate flow entry 20-1. The data includes an idle timeout value, which in this example, is 30 seconds.

The controller node 12 receives, from the ingress node 14-1, microflow generation information that identifies a newly generated microflow associated with the devolve action (block 1002). The controller node 12 determines a continuity set ID associated with the new microflow (block 1004). In some embodiments, the controller node 12 generates the continuity set ID, and sends the continuity set ID to the ingress node 14-1 in conjunction with the devolve action. The microflow generation information provided by the ingress node 14-1 may include the continuity set ID to inform the controller node 12 that a microflow associated with the continuity set ID has been generated. In other embodiments, the ingress node 14-1 may generate the continuity set ID upon the generation of a first microflow at the ingress node 14-1, and provide the continuity set ID to the controller node 12 as part of the microflow generation information.

The controller node 12 determines a downstream node 14 to which the new microflow will be forwarded (block 1006). This may have occurred even before the controller node 12 sent the devolve action to the ingress node 14-1, because the controller node 12 may have sent the devolve action to the ingress node 14-1 to determine a path continuity status between the ingress node 14-1 and a particular downstream node 14. As discussed above, in this example, the particular downstream node 14 is the node 14-N. In some embodiments, the controller node 12 may send the downstream node 14-N microflow generation information that identifies the microflow to the downstream node 14-N, so that the downstream node 14-N can install a new microflow flow entry 20 in a flow table of the downstream node 14-N. In other embodiments, the ingress node 14-1 may send the downstream node 14-N microflow generation information that identifies the microflow to the downstream node 14-N.

The controller node 12 then determines a path continuity status between the ingress node 14-1 and the downstream node 14-N based on the receipt of one or more microflow termination messages from the ingress node 14-1 and the downstream node 14-N. For example, if the controller node 12 receives a first microflow termination message that includes the continuity set ID from the downstream node 14-N and, within a predetermined time interval, receives no microflow termination message that includes the continuity set ID from the ingress node 14-1, the controller node 12 may determine that the path continuity status between the ingress node 14-1 and the downstream node 14-N is bad. If, on the other hand, the controller node 12 receives a first microflow termination message that includes the continuity set ID from the downstream node 14-N and a second microflow termination message that includes the continuity set ID from the ingress node 14-1, irrespective of the order in which the two microflow termination messages were received, the controller node 12 may determine that the path continuity status between the ingress node 14-1 and the downstream node 14-N is undefined. In one embodiment, if, during a predetermined time interval, the controller node 12 receives no microflow termination messages from either the ingress node 14-1 or the downstream node 14-N, the controller node 12 may determine that the path continuity status between the ingress node 14-1 and the downstream node 14-N is good.

Figure 4:
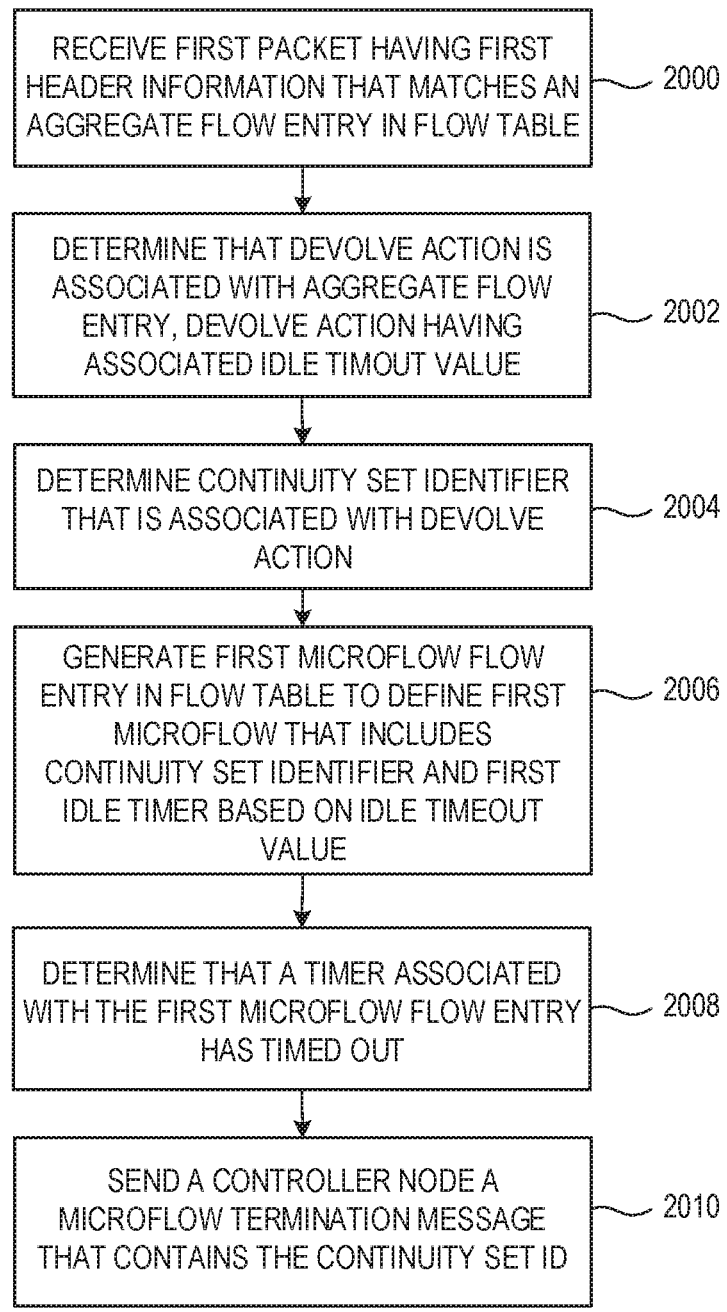
FIG. 4 is a flowchart of a method for terminating a microflow flow entry according to one embodiment.

FIG. 4 is a flowchart of a method for terminating a microflow flow entry 20 according to one embodiment. FIG. 4 will be discussed in conjunction with FIGS. 2A-2D. In this example, assume, as discussed above with regard to FIG. 3, that the ingress node 14-1 received a devolve action from the controller node 12 associated with the aggregate flow entry 20-1, and that the devolve action had an associated timeout value of 30 seconds. The ingress node 14-1 receives the packet 16-1, and determines that the header information in the header fields 24-1-24-7 of the packet 16-1 matches the values contained in the data fields 22-1-22-7 of the aggregate flow entry 20-1 in the flow table 18 (block 2000). The ingress node 14-1 determines that the devolve action is associated with the aggregate flow entry 20-1, based on, for example, the action field 26, and that devolve action has an associated idle timeout value (block 2002). The ingress node 14-1 determines the continuity set ID associated with the devolve action (block 2004). In one embodiment, the continuity set ID may have been provided by the controller node 12. In another embodiment, the ingress node 14-1 may generate a continuity set ID upon the generation of a first microflow flow entry 20 for a devolve action.

Based on the determination that the devolve action is associated with the aggregate flow entry 20-1, the ingress node 14-1 generates the microflow flow entry 20-2 in the flow table 18 to define a new microflow that includes the continuity set ID and a first idle timer based on the idle timeout value (block 2006). The ingress node 14-1 may also send information to the controller node 12 that identifies the new microflow to the controller node 12. In an OpenFlow embodiment, the OpenFlow messaging protocol may be extended to notify the controller node 12 of selected microflows by the ingress node 14-1. For each selected microflow, the flow definition (i.e., the values of the data fields 22) may be communicated to the controller node 12. A non-limiting example of a suitable structure is provided below:

```
struct microflow_notification {
    struct ofp_header header;
    uint64_t datapath_id;      /*Datapath unique ID*/
    uint8_t table_id;    /* ID of the table where the flow is stored.*/
    struct ofp_match match;         /* Flow data fields matching the microflow.*/
    CSID;    /* continuity set ID for the microflow
}
```

The ingress node 14-1 determines that a timer, such as the first idle timer, has timed out (block 2008). The ingress node 14-1 removes each microflow flow entry 20 from the flow table 18 that has the continuity set ID. The ingress node 14-1 sends a microflow termination message that contains the continuity set ID to the controller node 12 (block 2010). In some embodiments, the ingress node 14-1 sends only one microflow termination message that contains the continuity set ID to the controller node 12, irrespective of the number of microflow flow entries 20 that include the continuity set ID. The microflow termination message may also include the reason for the microflow termination message, such as the timing out of the idle timer, or the timing out of the hard timeout timer. In an OpenFlow embodiment, the microflow termination message may comprise a standard OpenFlow FLOW_REMOVED message.

Figure 5:
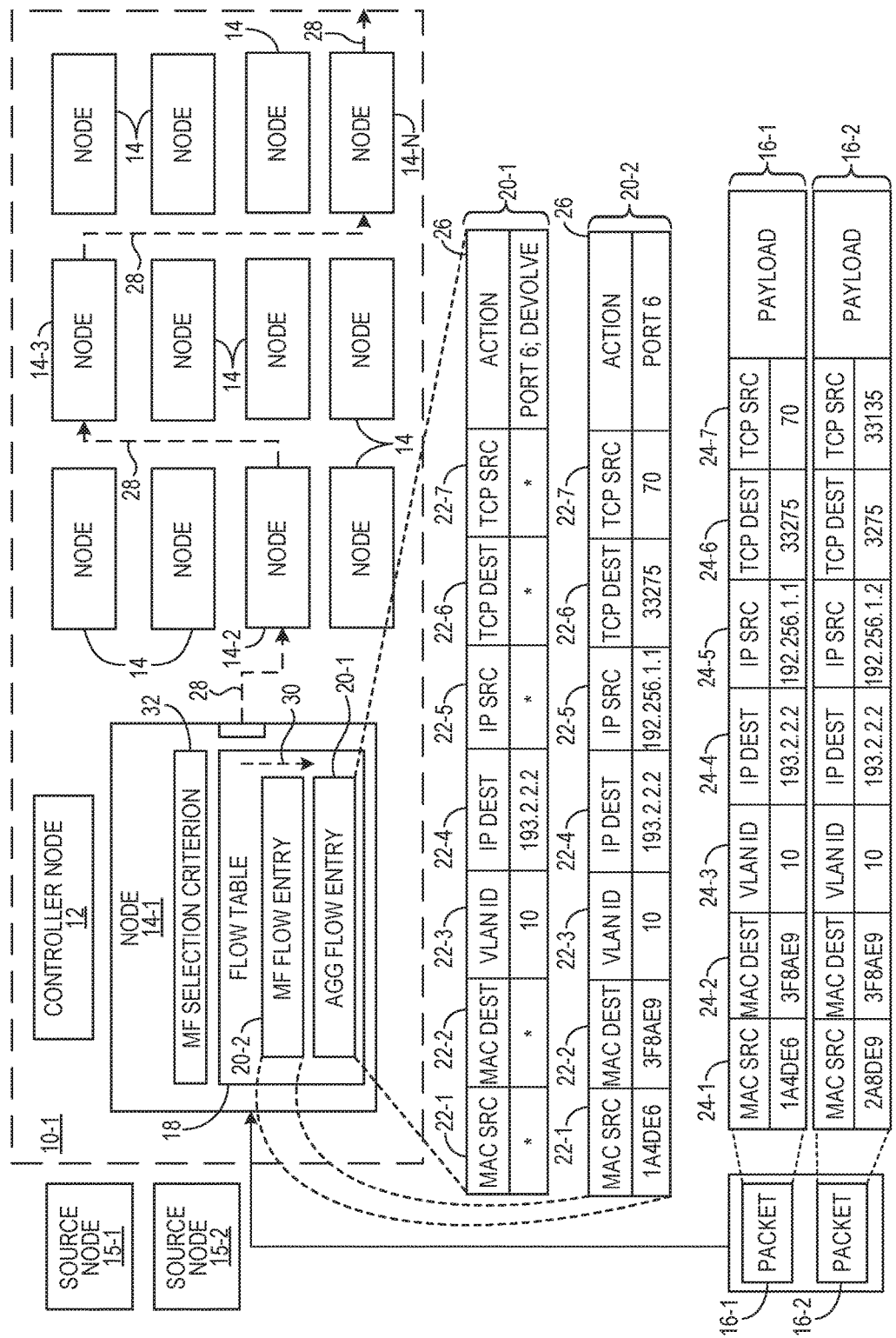
FIG. 5 is a block diagram of the network illustrated in FIGS. 2A-2D wherein the ingress node further accesses one or more microflow selection criterion to determine whether to generate a new microflow.

FIG. 5 is a block diagram of the network 10-1 illustrated in FIG. 2A wherein the ingress node 14-1 further accesses one or more microflow selection criterion 32 to determine whether to generate a new microflow. The microflow selection criterion 32 may be operationally configured into the ingress node 14-1, may be downloaded from a remote location by the ingress node 14-1, or may be provided by the controller node 12. The microflow selection criterion 32 can comprise any desirable criteria for determining whether or not to devolve, or generate, a new microflow that would otherwise be aggregated into an aggregate flow, such as via the aggregate flow entry 20-1. By way of non-limiting example, the microflow selection criterion 32 may comprise a predetermined number of devolved microflows, and/or a predetermined number of devolved microflows per media access control (MAC) source address, MAC destination address, internet protocol (IP) source address, IP destination address, Virtual Private Network (VPN), Multiprotocol Label Switching (MPLS) label, destination port, or the like, as identified in the header fields 24 of a packet 16. For purposes of illustration, the microflow selection criterion 32 is depicted as being stored separately from the aggregate flow entry 20-1, but, in other embodiments, the microflow selection criterion 32 may be stored as part of the aggregate flow entry 20-1. Moreover, the ingress node 14-1 may have multiple aggregate flow entries, and each aggregate flow entry may have a different microflow selection criterion 32. The microflow selection criterion 32 may comprise any combination of criteria, such as a predetermined number of flows for a certain combination of an MPLS label and a source MAC address. The selection criteria may comprise ranges of possible values of one or more of the header fields 24 of a packet 16, including, by way of non-limiting example, ranges of source and or destination MAC addresses, ranges of source and/or destination IP addresses, ranges of port numbers, and the like. The selection criteria may comprise a predetermined number of random microflows over a predetermined period of time. In some embodiments, the ingress node 14-1 may also have a particular amount of space allocated in the flow table 18 that limits a total number of microflow entries. If the total number of microflow entries is reached, the ingress node 14-1 does not generate additional microflows until a microflow terminates. The amount of space for microflow entries may be identified per aggregate flow entry in some embodiments. The microflow selection criterion 32 may also be updated dynamically by the controller node 12 based on any other criteria, such as a determination that there are communication issues with a particular node 14, a particular path 28, or the like.

As an example, assume that the ingress node 14-1 receives the packet 16-1, and determines that the packet 16-1 matches the aggregate flow entry 20-1. Assume that the microflow selection criterion 32 indicate that only one microflow per destination IP address is to be generated. The ingress node 14-1 determines that no other flow entries 20 exist for the destination IP address identified in the header field 24-4 of the packet 16-1, and based on the devolve action identified in the aggregate flow entry 20-1 and the microflow selection criterion 32, generates the microflow flow entry 20-2.

The ingress node 14-1 next processes the packet 16-2 and determines that the packet 16-2 does not match the microflow flow entry 20-2 but does match the aggregate flow entry 20-1. The ingress node 14-1 determines that the action field 26 of the aggregate flow entry 20-1 contains a devolve action, and accesses the microflow selection criterion 32. The microflow selection criterion 32 indicates that only one microflow per destination IP address is to be generated. The ingress node 14-1 determines that the microflow defined by the microflow flow entry 20-2 contains the same destination IP address as that identified in the header field 24-4 of the packet 16-2 and, thus, that a microflow for such destination IP address has already been devolved and, based on such determination, does not generate an additional flow entry 20. In this example, the determination to devolve a microflow is made concurrently with the determination of the microflow selection criterion 32. If the microflow selection criterion 32 is not met, the microflow is not devolved. In other embodiments, the microflow may be devolved automatically, but only reported to the controller node 12 after it is determined that the microflow selection criterion 32 is met. This may be particularly appropriate when the microflow selection criterion 32 cannot be determined until the microflow has been in existence for a period of time, such as a microflow selection criterion 32 that is based on a number of packets 16, amount of bandwidth, or other usage metric.

In embodiments wherein the ingress node 14-1 may be controlled by NETCONF and SNMP, if the microflow is selected, the data fields 22 of the flow entry 20 for the microflow may be used to create a managed object in a management information base (MIB).

Figure 6A:
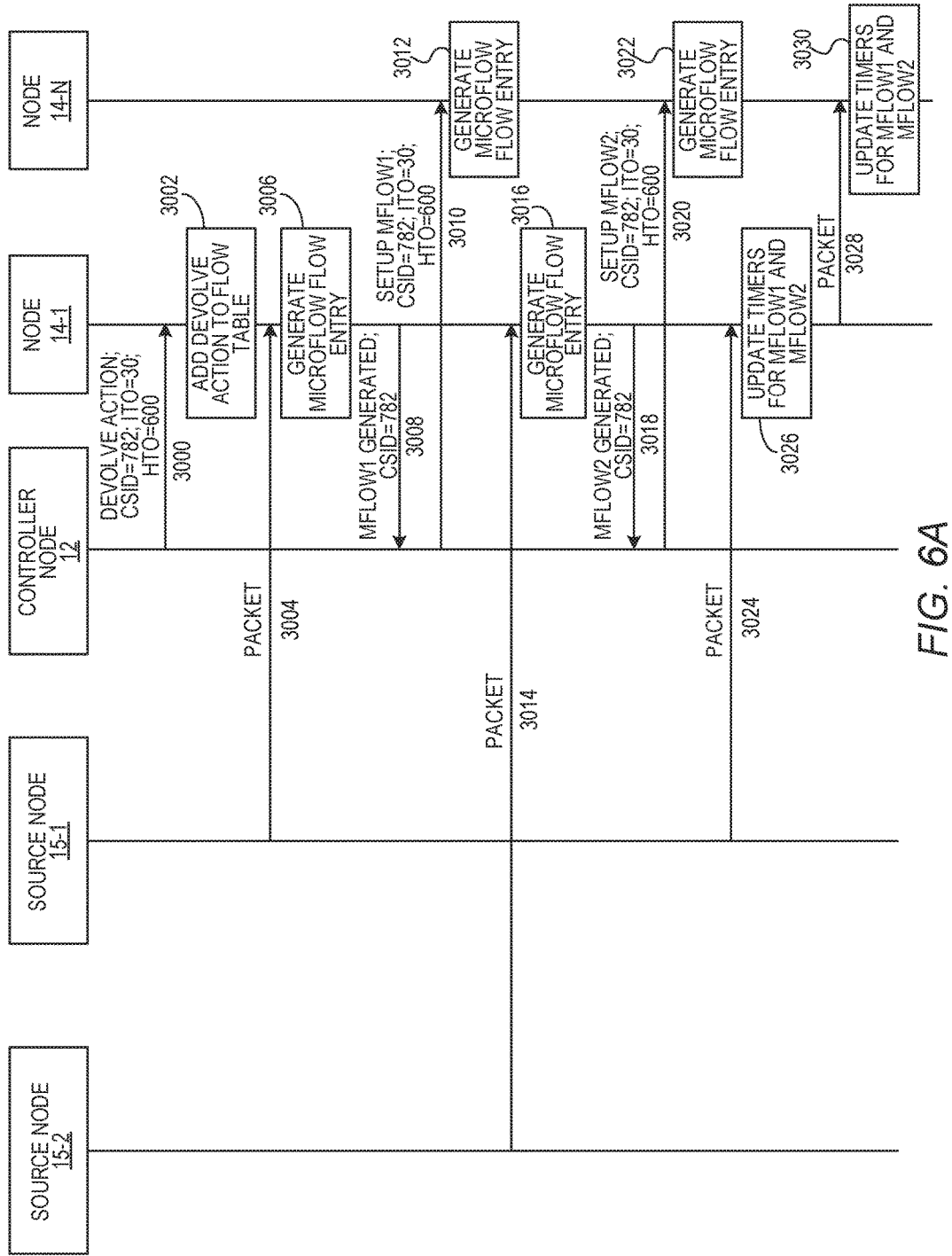
FIG. 6A is a message flow diagram that illustrates an example flow of messages, and corresponding actions, for setting up a plurality of microflows that have a same continuity set identifier (ID) on an ingress node and a downstream node according to one embodiment.

FIG. 6A is a message flow diagram that illustrates an example flow of messages, and corresponding actions, for setting up a plurality of microflows that have a same continuity set ID on the ingress node 14-1 and the downstream node 14-N according to one embodiment. Initially, the controller node 12 sends one or more messages to the ingress node 14-1 to set up the aggregate flow entry 20-1, associate the devolve action with the aggregate flow entry 20-1, and identify the microflow selection criteria 32 for the ingress node 14-1 to use in determining when to generate a new microflow (step 3000). In this example, the devolve action includes an idle timeout value of 30, a hard timeout value of 600, and a continuity set ID of 782.

In one embodiment, the devolve action is sent by the controller node 12 to the ingress node 14-1 responsive to a desire to determine a path continuity status between two nodes 14. The controller node 12 may make this determination and associate a continuity set ID with the two nodes 14, and store this information in the controller node 12 for subsequent processing. The controller node 12 may then send the ingress node 14-1 microflow selection criteria 32 that ensures that the devolved microflows are processed by both the ingress node 14-1 and the downstream node 14-N.

The ingress node 14-1 adds the devolve action to the flow table 18 (step 3002). The source node 15-1 sends a packet 16 to the ingress node 14-1 (step 3004). The ingress node 14-1 determines that the packet 16 matches the aggregate flow entry 20-1. Assume for purposes of illustration that the attributes of the packet 16 fits within, or matches, the microflow selection criteria 32. The ingress node 14-1 sets up a new (first) microflow flow entry 20 based on the devolve action (step 3006). The new microflow flow entry 20 includes a continuity set ID of 782, an idle timer set to an initial value of 30, and a hard timeout timer set to an initial value of 600. The idle timer counts down continuously, and is reset to the idle timeout value (i.e., in this example 30), each time the ingress node 14-1 receives a packet 16 associated with any microflow having the same continuity set ID. Thus, if the idle timer times out, then no packets 16 have been received by the ingress node 14-1 for any microflow having the same continuity set ID for the period of time defined by the idle timeout value. The hard timeout timer also counts down continuously, and is not reset. Thus, the hard timeout timer identifies a maximum period of time for the life of all microflows with a particular continuity set ID.

The ingress node 14-1 sends microflow generation information that identifies the new microflow to the controller node 12 (step 3008). The microflow generation information may comprise, for example, values contained in the data fields 22 (FIG. 2B) of the microflow flow entry 20 that match header information in the packet 16. The microflow generation information may also include the continuity set ID. In this example, the controller node 12 receives the microflow generation information and identifies the downstream node 14-N as a node 14 to which the microflow will be forwarded. As discussed above, in one embodiment, this may be determined based on the continuity set ID, and previously stored information that identifies the two nodes 14 associated with the continuity set ID.

The controller node 12 sends the downstream node 14-N microflow generation information that directs the downstream node 14-N to set up a new microflow flow entry on the downstream node 14-N that includes a continuity set ID of 782, an idle timer set to an initial value of 30, and a hard timeout timer set to an initial value of 600 (step 3010). The downstream node 14-N generates a new flow entry in a flow table of the downstream node 14-N to define the new microflow (step 3012).

If the network 10-1 utilizes the OVSDB protocol for control of the nodes 14, the controller node 12 may utilize an "insert" operation. Alternatively, the controller node 12 may utilize a NETCONF edit-configuration operation to create an associated Applications Performance Measurement (APM) Management Information Base (MIB) Flow Aggregation table entry. In a Route Information Base (RIB)/Flow cache context, the controller node 12 may insert the microflow flow entry 20 into the IP Flow Information Export (IPFIX) cache of the nodes 14.

In an OpenFlow embodiment, interactions between the controller node 12 and the ingress node 14-1 may be expanded to implement some of the functionality described herein. In one embodiment, configuration interactions may be extended to include a microflow selection criteria configuration, and an idle timeout period of time configuration. Various examples of microflow selection criteria 32 are provided above. In one embodiment, the idle timeout period of time can be a static value configurable via the controller node 12. In one embodiment, the value of the idle timeout period of time can be inherited from the aggregate flow entry 20-1. The idle timeout period of time can also be a static default value configurable via the controller node 12. The idle timeout period of time can also be chosen individually for each microflow based on policies installed by the controller node 12.

Non-limiting examples of a microflow selection criteria configuration message and an idle timeout configuration message suitable for implementing the functionality discussed herein, according to one OpenFlow embodiment, are provided below:

```
    enum selection_policy_type {
SELECT_ALL = 1 << 0; /* select all microflows for packet-loss
measurements */
SAMPLE_RANDOM = 1 << 1; /* select a random sample of
microflows*/
```

-continued

```
SAMPLE_IP_RANGE = 1 << 2; /* select a random sample of
microflows in specified IP number ranges */
SAMPLE_PORT_RANGE = 1 << 3; /* select a random sample
of microflows in specified TCP/UDP port number ranges */
};
    struct config_loss_node_all {
uint16_t type;     /* Type SELECT_ALL */
uint32_t idle_timeout;   /* Default idle_timeout for all microflows
*/
}
    struct config_loss_node_random {
uint16_t type;              /* Type SAMPLE_RANDOM */
uint8_t probability         /* Sampling probability p */
uint32_t idle_timeout;      /* Default idle_timeout for all microflows
*/
}
    struct config_loss_IP_range {
uint16_t type;      /* Type SAMPLE_IP_RANGE */
uint8_t probability          /* Sampling probability p */
enum range_type {
  source = 1 << 0; /* the specified range target source
addresses */
  destination = 1 << 1; /* the range targets destination
addresses */
};
uint8_t range_type r;
struct in_addr begin_range      /* First address of the IP range,
from which flows should be randomly selected */
struct in_addr end_range        /* Last address of the IP range
uint32_t idle_timeout;  /* Default idle_timeout for all microflows
*/
}
```

The source node 15-2 sends a packet 16 to the ingress node 14-1 (step 3014). The ingress node 14-1 determines that the packet 16 does not match the existing (first) microflow flow entry 20 having a continuity set ID of 782, but does match the aggregate flow entry 20-1. The ingress node 14-1 sets up a new (second) microflow flow entry 20 based on the devolve action (step 3016). The new microflow flow entry 20 includes a continuity set ID of 782, an idle timer set to an initial value of 30, and a hard timeout timer set to an initial value of 600. The ingress node 14-1 sends microflow generation information that identifies the new microflow to the controller node 12 (step 3018). The microflow generation information may comprise, for example, values contained in the data fields 22 of the flow entry 20 that matches header information in the packet 16. The microflow generation information may also include the continuity set ID. In this example, the controller node 12 receives the microflow generation information and identifies the downstream node 14-N as a node 14 to which the microflow will be forwarded. As discussed above, in one embodiment, this may be determined based on the continuity set ID, and previously stored information that identifies the two nodes 14 associated with the continuity set ID.

The controller node 12 sends the downstream node 14-N microflow generation information that directs the downstream node 14-N to set up a new (second) microflow flow entry 20 on the downstream node 14-N that includes a continuity set ID of 782, an idle timer set to an initial value of 30, and a hard timeout timer set to an initial value of 600 (block 3020). The downstream node 14-N generates a new microflow flow entry 20 in a flow table of the downstream node 14-N to define the new microflow (step 3022).

The source node 15-1 sends another packet to the ingress node 14-1 (step 3024). The ingress node 14-1 determines, based on the flow table 18, that the packet 16 is associated with the first microflow flow entry 20 that has a continuity set ID of 782. The ingress node 14-1 updates the idle timers of all microflow flow entries 20 that have a continuity set ID of 782 (step 3026). The ingress node 14-1 forwards the packet 16 directly, or via intervening nodes 14, to the downstream node 14-N (step 3028). The downstream node 14-N receives the packet 16 and, based on the flow table 18, determines that the packet 16 is associated with a microflow flow entry 20 that has a continuity set ID of 782. The downstream node 14-N updates the idle timers of all microflow flow entries 20 that have a continuity set ID of 782 (step 3030).

FIGS. 6B1-6B3 are message flow diagrams illustrating the controller node 12 making path continuity status determinations based on three different alternative situations after the sequence of actions discussed above with regard to FIG. 6A. FIG. 6B1 illustrates a sequence of actions that may result in the controller node 12 determining that the path continuity status between the ingress node 14-1 and the downstream node 14-N is undefined. In this first example, the ingress node 14-1 determines that the idle timer of a microflow having a continuity set ID of 728 has timed out (step 4000). The ingress node 14-1 removes from the flow table 18 each microflow flow entry 20 that has a continuity set ID of 728 (step 4002). The ingress node 14-1 sends the controller node 12 a microflow termination message that includes the continuity set ID of 728 (step 4004). The controller node 12 receives the microflow termination message that includes the continuity set ID of 728, and starts a timer for a predetermined period of time (step 4006). The downstream node 14-N also determines that the idle timer of a microflow having a continuity set ID of 728 has timed out (step 4008). The downstream node 14-N removes from the flow table 18 each microflow flow entry 20 that has a continuity set ID of 728 (step 4010). The downstream node 14-N sends the controller node 12 a microflow termination message that includes the continuity set ID of 728 (step 4012).

The controller node 12 receives the microflow termination message that includes the continuity set ID of 728 from the downstream node 14-N, and based on the receipt of the microflow termination message from the ingress node 14-1 and the microflow termination message from the downstream node 14-N within the predetermined period of time, determines that the path continuity status is undefined (step 4014). The path continuity status is undefined because at that point in time no microflows between the nodes 14-1 and 14-N exist. The controller node 12 may perform a suitable action based on this determination (step 4016). For example, the controller node 12 may update a user interface that contains graphical imagery that depicts real-time path continuity statuses between various nodes 14.

FIG. 6B2 illustrates a sequence of actions that may result in the controller node 12 determining that the path continuity status between the ingress node 14-1 and the downstream node 14-N is good. In this second example, the controller node 12 sets a timer for a predetermined period of time (step 5000). The predetermined period of time may be any suitable time period, but, in some examples, may be longer than the idle timeout value associated with the continuity set ID of 782. The source node 15-1 sends a packet 16 to the ingress node 14-1 (step 5002). The ingress node 14-1 determines, based on the flow table 18, that the packet 16 is associated with the first microflow flow entry 20 that has a continuity set ID of 782 and updates the idle timers of all microflow flow entries 20 that have a continuity set ID of 782 (steps 5002-5004). The ingress node 14-1 forwards the packet 16 directly, or via intervening nodes 14, to the downstream node 14-N (step 5006). The downstream node 14-N receives the packet 16 and, based on the flow table 18, determines that the packet 16 is associated with a microflow flow entry 20 that has a continuity set ID of 782, and updates the idle timers of all microflow flow entries 20 that have a continuity set ID of 782 (step 5008). The timer set by the controller node 12 times out (step 5010). Based on not having received any microflow termination messages from either the ingress node 14-1 or the downstream node 14-N during the predetermined period of time, the controller node 12 determines that the path continuity status between the ingress node 14-1 and the downstream node 14-N is good (step 5012). The controller node 12 may perform a suitable action based on this determination (step 5014). For example, the controller node 12 may update a user interface that contains graphical imagery that depicts real-time path continuity statuses between various nodes 14.

FIG. 6B3 illustrates a sequence of actions that may result in the controller node 12 determining that the path continuity status between the ingress node 14-1 and the downstream node 14-N is bad. In this third example, the source node 15-1 sends a packet 16 to the ingress node 14-1 (step 6000). The ingress node 14-1 determines, based on the flow table 18, that the packet 16 is associated with the first microflow flow entry 20 that has a continuity set ID of 782 and updates the idle timers of all microflow flow entries 20 that have a continuity set ID of 782 (step 6002). The ingress node 14-1 forwards the packet toward the downstream node 14-N (step 6004). The packet does not arrive at the downstream node 14-N. The downstream node 14-N determines that the idle timer of a microflow having a continuity set ID of 728 has timed out (step 6006). The downstream node 14-N removes from the flow table 18 each microflow flow entry 20 that has a continuity set ID of 728 (step 6008). The downstream node 14-N sends the controller node 12 a microflow termination message that includes the continuity set ID of 728 (step 6010). The controller node 12 receives the microflow termination message that includes the continuity set ID of 728 from the downstream node 14-N. Based on the receipt of the microflow termination message from the downstream node 14-N but no microflow termination message from the ingress node 14-1, the controller node 12 determines that the path continuity status is bad (step 6012). The controller node 12 may perform a suitable action based on this determination (step 6014). For example, the controller node 12 may issue an alarm or alert to an operator or a network management system. In one embodiment, the controller node 12 may determine a new path for subsequent packets based on the determination that the path continuity status is bad. The controller node 12 may also store any available information for subsequent analysis.

Figure 7:
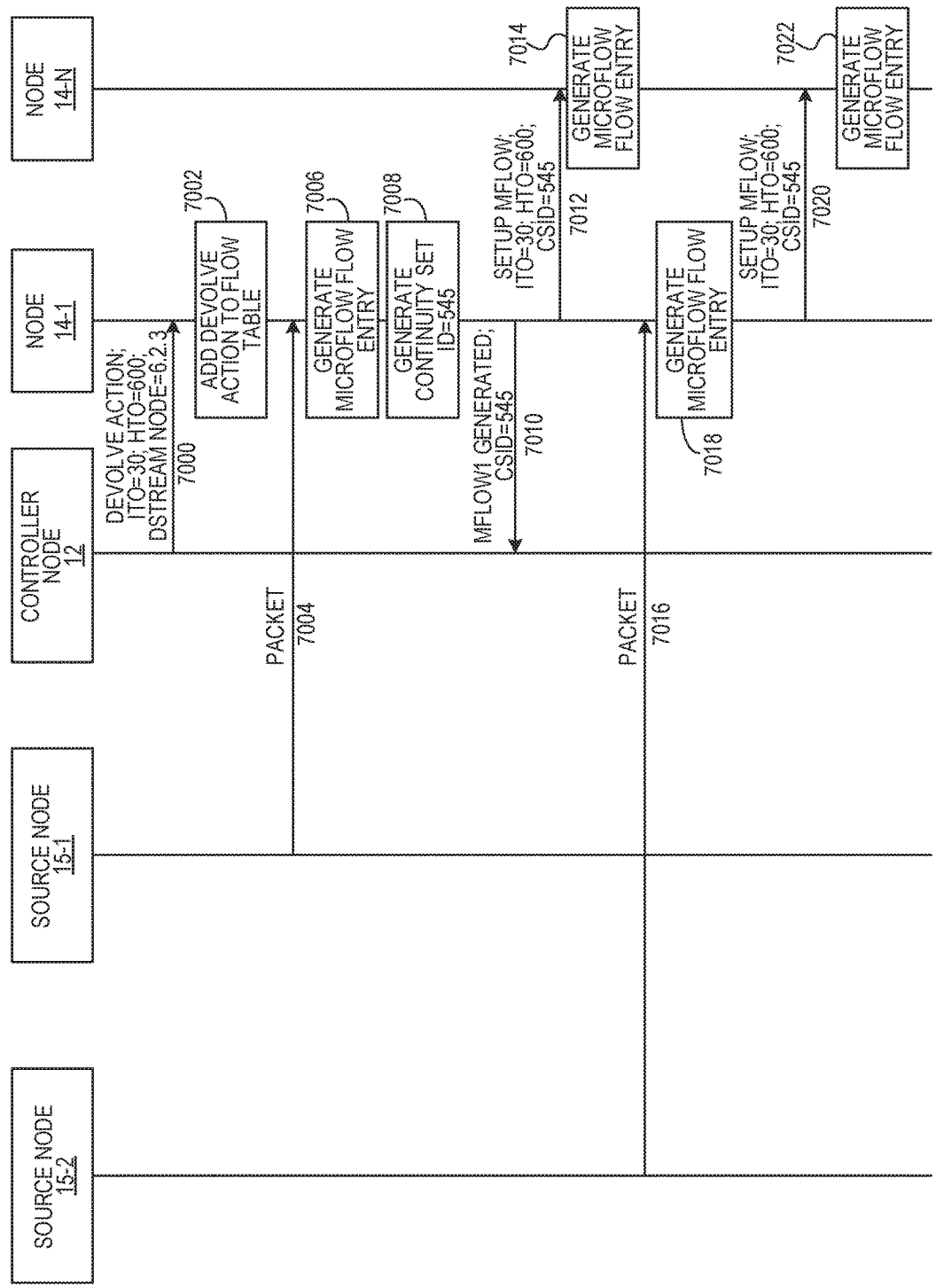
FIG. 7 is a message flow diagram that illustrates an example flow of messages, and corresponding actions, for setting up a plurality of microflows that have a same continuity set ID on an ingress node and a downstream node according to another embodiment, wherein the ingress node, rather than the controller node, directs the downstream node to generate the microflows on the downstream node and also generates the continuity set ID.

FIG. 7 is a message flow diagram that illustrates an example flow of messages, and corresponding actions, for setting up a plurality of microflows that have a same continuity set ID on an ingress node 14-1 and a downstream node 14-N according to another embodiment, wherein the ingress node 14-1, rather than the controller node 12, directs the downstream node 14-N to generate the microflows on the downstream node 14-N and is responsible for generating the continuity set ID. Initially, the controller node 12 may determine that a path continuity status between two nodes 14 should be determined. This may be in response to operator input, some event that occurred on the network 10-1, or some other condition. For purposes of illustration, assume that the path continuity status between the ingress node 14-1 and downstream node 14-N is to be determined. The controller node 12 sends one or more messages to the ingress node 14-1 that directs the ingress node 14-1 to set up an aggregate flow entry and associate the devolve action with the aggregate flow entry. The one or more messages also identify the microflow selection criteria 32 for the ingress node 14-1 to use in determining when to generate a new microflow, and include a downstream node identifier (i.e., 6.2.3) that identifies the downstream node 14-N to the ingress node 14-1 (step 7000). In this example, the devolve action includes an idle timeout value of 30 and a hard timeout value of 600.

The ingress node 14-1 adds the devolve action to the flow table 18 (step 7002). The source node 15-1 sends a packet 16 to the ingress node 14-1 (step 7004). The ingress node 14-1 determines that the packet 16 matches the aggregate flow entry. Assume for purposes of illustration that the attributes of the packet 16 fits within, or matches, the microflow selection criteria 32. The ingress node 14-1 sets up a new (first) microflow flow entry 20 based on the devolve action (step 7006). The ingress node 14-1 then generates a continuity set ID of 545 (step 7008). The ingress node 14-1 sends information to the controller node 12 that includes the continuity set ID of 545 and information that a microflow with a continuity set ID of 545 has been generated (step 7010). The controller node 12 may store the continuity set ID and the identification of the ingress node 14-1 and downstream node 14-N in a memory or data storage of the controller node 12. The ingress node 14-1 also sends the downstream node 14-N microflow generation information that directs the downstream node 14-N to set up a new microflow flow entry 20 on the downstream node 14-N that includes a continuity set ID of 545, an idle timer set to an initial value of 30, and a hard timeout timer set to an initial value of 600 (step 7012). The downstream node 14-N generates a new flow entry in a flow table of the downstream node 14-N to define the new microflow (step 7014).

The source node 15-2 sends a packet 16 to the ingress node 14-1 (step 7016). The ingress node 14-1 determines that the packet 16 does not match the existing (first) microflow flow entry 20 having a continuity set ID of 545, but does match the aggregate flow entry 20-1. The ingress node 14-1 sets up a new (second) microflow flow entry 20 based on the devolve action (step 7018). The new microflow flow entry 20 includes a continuity set ID of 545, an idle timer set to an initial value of 30, and a hard timeout timer set to an initial value of 600. The ingress node 14-1 sends the downstream node 14-N microflow generation information that directs the downstream node 14-N to set up a new (second) microflow flow entry 20 on the downstream node 14-N that includes a continuity set ID of 545, an idle timer set to an initial value of 30, and a hard timeout timer set to an initial value of 600 (block 7020). The downstream node 14-N generates a new flow entry in a flow table of the downstream node 14-N to define the new microflow (step 7022). Any of the alternative sequences of actions discussed above with regard to FIGS. 6B1-6B3 may take place subsequently.

While for purposes of illustration the ingress node 14-1 is shown as having only a single flow table 18, the embodiments are not so limited. In some embodiments, the nodes 14 may include a flow table pipeline that comprises a plurality of flow tables 18, such as may be utilized, by way of non-limiting example, in a network 10-1 that utilizes an OpenFlow 1.4 version architecture. In such embodiments, the auto-devolving functionality discussed herein may be applied to any such flow table 18 in the flow table pipeline. Preferably, instructions associated with an aggregate flow entry 20-1 are inherited by any microflow flow entries 20, including, for example, "GOTO" instructions that identify the next flow table 18 in the flow table pipeline.

In such a flow table pipeline embodiment, the respective flow table 18 should support the data fields 22 suitable for implementing the devolved microflows. Thus, for example, where a flow table 18 in a flow table pipeline directs aggregate flows based on a single data field 22, and where microflows are devolved from such flows based on four data fields 22, such flow table 18 should include support for storing the four data fields 22 for identifying the devolved microflows. In an OpenFlow context, this may be accomplished, in one embodiment, through an ofp_table_features request by setting an appropriate ofp_table_feature_prop_type OFPTFPT_MATCH.

Figure 8:
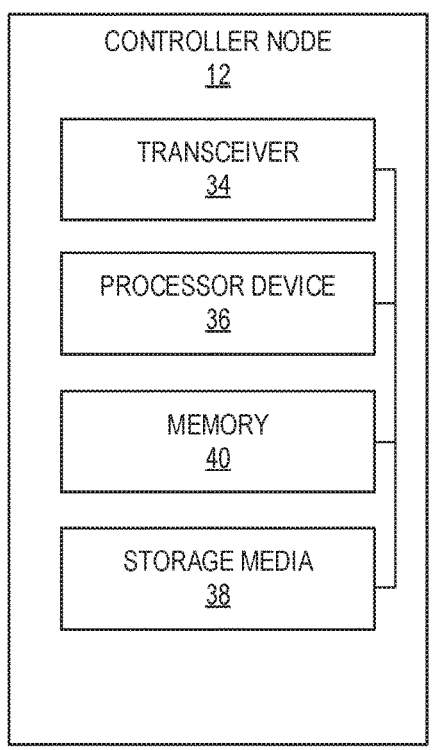
FIG. 8 is a block diagram of a controller node according to one embodiment.

While the controller node 12 may be implemented in any type of hardware or any combination of hardware in conjunction with software, FIG. 8 is a block diagram of the controller node 12 according to one embodiment. The controller node 12 includes, for example, a transceiver 34 and a processor device 36. The transceiver 34 generally includes components configured to facilitate sending and receiving data to and from other nodes, such as the nodes 14. Of course, the detailed operation for the transceiver 34 and the processor device 36 will vary depending on both the particular implementation and the standard or standards supported by the controller node 12. Those skilled in the art will appreciate that the block diagram of the controller node 12 necessarily omits numerous features that are not necessary to a complete understanding of this disclosure. Although all of the details of the processor device 36 are not illustrated, the processor device 36 comprises one or several general-purpose or special-purpose processors or other microcontrollers programmed with suitable software programming instructions and/or firmware to carry out some or all of the functionality of the controller node 12 described herein. In addition, or alternatively, the processor device 36 comprises various digital hardware blocks (e.g., one or more Application Specific Integrated Circuits (ASICs), one or more off-the-shelf digital or analog hardware components, or a combination thereof) configured to carry out some or all of the functionality of the controller node 12 described herein.

The controller node 12 may also include one or more storage media 38 and a memory 40 for storing data necessary and/or suitable for implementing the functionality described herein, as well as for storing complex programming instructions which, when executed on the processor device 36, may implement all or part of the functionality described herein. One embodiment of the disclosure may be implemented as a computer program product that is stored on a computer-readable storage medium, the computer program product including complex programming instructions that are configured to cause the processor device 36 to carry out the steps described herein. In one embodiment, a carrier containing the computer program is provided, wherein the carrier is one of an electronic signal, an optical signal, a radio signal, or the computer readable storage medium (e.g., a non-transitory computer readable medium). Embodiments of a computer program are also disclosed. In some embodiments, the computer program comprises instructions that, when executed on the processor device 36, cause the processor device 36 to carry out the method of operation of the controller node 12 according to any of the embodiments described herein.

Figure 9:
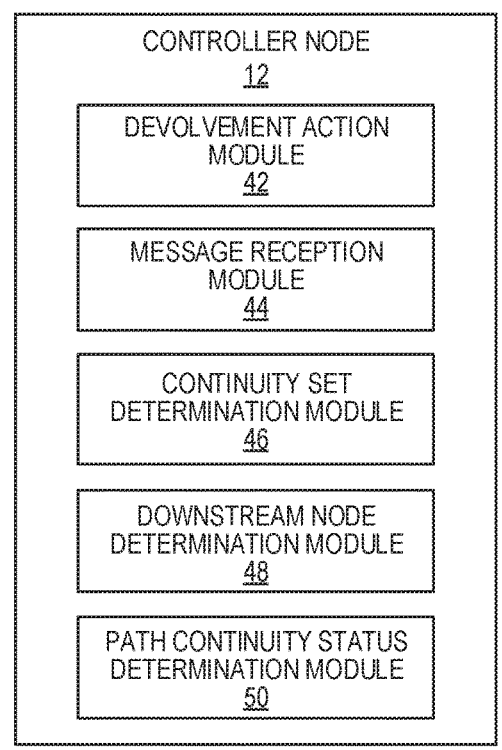
FIG. 9 is a functional block diagram of the controller node according to one embodiment.

FIG. 9 is a functional block diagram of the controller node 12 according to one embodiment. While the functionality of the controller node 12 discussed herein may be implemented in any number of modules, dependent on desired design criteria, in one embodiment, the controller node 12 includes a devolvement action module 42 configured to send data that establishes a devolve action in association with an aggregate flow entry at the ingress node 14-1. A message reception module 44 is configured to receive, from the ingress node 14-1, microflow generation information that identifies a new microflow associated with the devolve action. A continuity set determination module 46 is configured to determine a continuity set ID associated with the new microflow. A downstream node determination module 48 is configured to notify a downstream node 14-N in a path of a microflow about the newly generated microflow. A path continuity status determination module 50 is configured to determine a path continuity status between the ingress node 14-1 and the downstream node based on a receipt of one or more microflow termination messages from the ingress node 14-1 and the downstream node 14-N.

Figure 10:
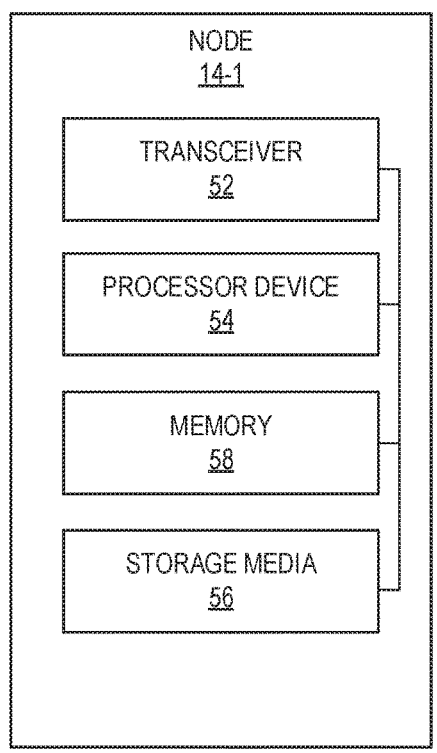
FIG. 10 is a block diagram of an ingress node according to one embodiment.

While the ingress node 14-1 may be implemented in any type of hardware or any combination of hardware in conjunction with software, FIG. 10 is a block diagram of the ingress node 14-1 according to one embodiment. The ingress node 14-1 includes, for example, a transceiver 52 and a processor device 54. The transceiver 52 generally includes components configured to facilitate sending and receiving data to and from other nodes, such as the other nodes 14 and the controller node 12. The detailed operation for the transceiver 52 and the processor device 54 may vary depending on both the particular implementation and the standard or standards supported by the ingress node 14-1. Those skilled in the art will appreciate that the block diagram of the ingress node 14-1 necessarily omits numerous features that are not necessary to a complete understanding of this disclosure. Although all of the details of the processor device 54 are not illustrated, the processor device 54 comprises one or several general-purpose or special-purpose processors or other microcontrollers programmed with suitable software programming instructions and/or firmware to carry out some or all of the functionality of the ingress node 14-1 described herein. In addition, or alternatively, the processor device 54 comprises various digital hardware blocks (e.g., one or more ASICs, one or more off-the-shelf digital or analog hardware components, or a combination thereof) configured to carry out some or all of the functionality of the ingress node 14-1 described herein.

The ingress node 14-1 may also include one or more storage media 56 and a memory 58 for storing data necessary and/or suitable for implementing the functionality described herein, as well as for storing complex programming instructions which, when executed on the processor device 54, may implement all or part of the functionality described herein. One embodiment of the disclosure may be implemented as a computer program product that is stored on a computer-readable storage medium, the computer program product including complex programming instructions that are configured to cause the processor device 54 to carry out the steps described herein. In one embodiment, a carrier containing the computer program is provided, wherein the carrier is one of an electronic signal, an optical signal, a radio signal, or the computer readable storage medium (e.g., a non-transitory computer readable storage medium). Embodiments of a computer program are also disclosed. In some embodiments, the computer program comprises instructions that, when executed on the processor device 54, cause the processor device 54 to carry out the method of operation of the ingress node 14-1 according to any of the embodiments described herein.

Figure 11:
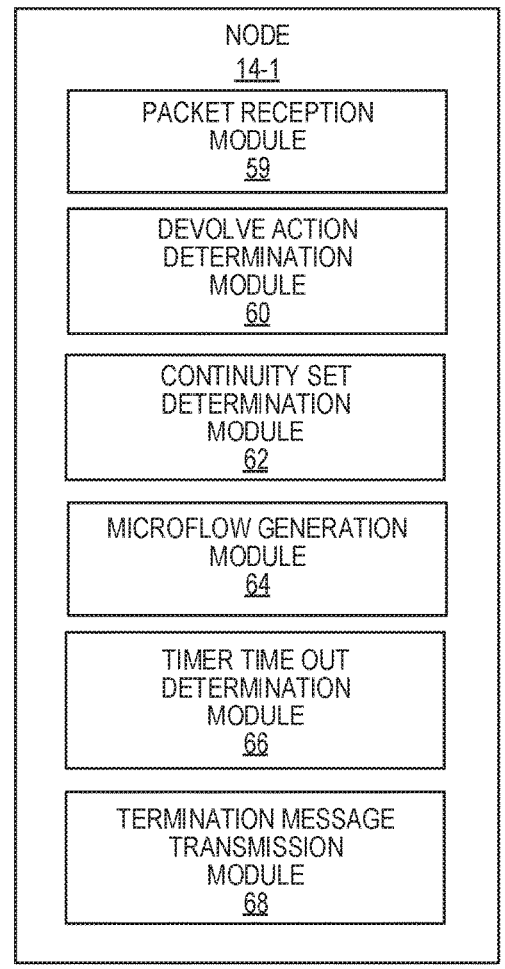
FIG. 11 is a functional block diagram of the ingress node according to one embodiment.

FIG. 11 is a functional block diagram of the ingress node 14-1 according to one embodiment. While the functionality of the ingress node 14-1 discussed herein may be implemented in any number of modules, dependent on desired design criteria, in one embodiment, the ingress node 14-1 includes a packet reception module 59 configured to receive a first packet 16 having first header information that matches an aggregate flow entry 20-1 in a flow table 18. A devolve action determination module 60 is configured to determine that a devolve action is associated with the aggregate flow entry 20-1. A continuity set determination module 62 is configured to determine a continuity set identifier that is associated with the devolve action. A microflow generation module 64 is configured to generate a first microflow flow entry 20 in the flow table 18 to define a first microflow. A timer timeout determination module 66 is configured to determine that a timer associated with the first microflow flow entry 20 has timed out. A termination message transmission module 68 is configured to send the controller node 12 a microflow termination message that comprises the continuity set identifier.

The following acronyms are used throughout this disclosure:
APM Applications Performance Measurement
ASICs Application Specific Integrated Circuits
CCPNA Centralized Control Plane Networking Architecture
CSID Continuity Set Identifier
HTO Hard Timeout Timer
ID Identifier
IP Internet Protocol
IPFIX Internet Protocol Flow Information Export
ITO Idle Timeout Timer
MAC Media Access Control
MF Microflow
MIB Management Information Base
MPLS Multiprotocol Label Switching Label
NETCONF Network Configuration Protocol
OAM Operation, Administration and Maintenance
OVSDB Open vSwitch Database Management Protocol
RIB Route Information Base
SDN Software-Defined Network
SNMP Simple Network Management Protocol
VPN Virtual Private Network Those skilled in the art will recognize improvements and modifications to the embodiments of the disclosure. All such improvements and modifications are considered within the scope of the concepts disclosed herein and the claims that follow.

What is claimed is:

1. A method for generating a microflow, comprising:
receiving, by an ingress node comprising a processor device, a first packet having first header information that matches an aggregate flow entry in a flow table;
determining that a devolve action is associated with the aggregate flow entry, the devolve action having an associated idle timeout value;
determining a continuity set identifier that is associated with the devolve action;
based on determining that the devolve action is associated with the aggregate flow entry, generating a first microflow flow entry in the flow table to define a first microflow, the first microflow flow entry including a data field identifying the continuity set identifier and at least one of a data field maintaining a first idle timer that has an initial value equal to the idle timeout value and a data field maintaining a hard timeout timer that has an initial value equal to a hard timeout value;

determining that at least one of the first idle timer and the hard timeout timer associated with the first microflow flow entry has timed out; and in response to determining that at least one of the first idle timer and the hard timeout timer has timed out, sending a controller node a microflow termination message that comprises the continuity set identifier.

2. The method of claim 1 further comprising sending first microflow generation information that identifies the first microflow to the controller node.

3. The method of claim 1 further comprising:
receiving, from the controller node, a downstream node identifier that identifies a downstream node associated with the continuity set identifier;
sending information that identifies the first microflow to the controller node; and
sending first microflow generation information that identifies the first microflow to the downstream node.

4. The method of claim 3 wherein:
determining the continuity set identifier that is associated with the devolve action comprises generating, by the ingress node, the continuity set identifier; and
sending the information that identifies the first microflow to the controller node comprises sending information that identifies the first microflow and that identifies the continuity set identifier to the controller node.

5. The method of claim 1 wherein determining the continuity set identifier that is associated with the devolve action comprises receiving, from the controller node, the continuity set identifier.

6. The method of claim 1 further comprising:
prior to determining that at least one of the first idle timer and the hard timeout timer has timed out, receiving, by the ingress node, a second packet having second header information that matches the aggregate flow entry in the flow table, the second header information differing from the first header information; and
based on determining that the devolve action is associated with the aggregate flow entry, generating a second microflow flow entry in the flow table to define a second microflow, the second microflow flow entry including the continuity set identifier and a second idle timer based on the idle timeout value.

7. The method of claim 6 wherein the timer that timed out comprises the first idle timer, and further comprising removing each microflow flow entry from the flow table that has the continuity set identifier including the first microflow flow entry and the second microflow flow entry.

8. The method of claim 6 further comprising:
receiving, by the ingress node, a third packet having third header information that matches one of the first header information and the second header information; and
in response to receiving the third packet, resetting the first idle timer and the second idle timer based on the idle timeout value.

9. The method of claim 6 wherein the timer that timed out comprises the first hard timeout timer, and further comprising removing each microflow flow entry from the flow table that has the continuity set identifier including the first microflow flow entry and the second microflow flow entry.

10. The method of claim 1, further comprising:
receiving, from the controller node, a microflow selection criterion; and
wherein generating the first microflow flow entry in the flow table further comprises generating the first microflow flow entry based on determining that the devolve action is associated with the aggregate flow entry and based on the microflow selection criterion.

11. The method of claim 1 wherein sending the controller node the microflow termination message that comprises the continuity set identifier comprises sending the controller node only one microflow termination message that comprises the continuity set identifier.

12. The method of claim 1 further comprising in response to determining that at least one of the first idle timer and the hard timeout timer has timed out, removing each microflow flow entry from the flow table that has the continuity set identifier.

13. A node comprising:
a transceiver configured to communicate with a network; and
a processor device coupled to the transceiver and configured to:
receive a first packet having first header information that matches an aggregate flow entry in a flow table;
determine that a devolve action is associated with the aggregate flow entry, the devolve action having an associated idle timeout value;
determine a continuity set identifier that is associated with the devolve action;
based on determining that the devolve action is associated with the aggregate flow entry, generate a first microflow flow entry in the flow table to define a first microflow, the first microflow flow entry including a data field identifying the continuity set identifier and at least one of a data field maintaining a first idle timer that has an initial value equal to the idle timeout value and a data field maintaining a hard timeout timer that has an initial value equal to a hard timeout value;
determine that at least one of the first idle timer and the hard timeout timer associated with the first microflow flow entry has timed out; and
in response to determining that at least one of the first idle timer and the hard timeout timer has timed out, send a controller node a microflow termination message that comprises the continuity set identifier.

14. A computer program product for generating a microflow stored on a non-transitory computer-readable storage medium and including instructions configured to cause a processor device to carry out the steps of:
receiving a first packet having first header information that matches an aggregate flow entry in a flow table;
accessing an action field in the aggregate flow entry;
determining that the action field identifies a devolve action, and an associated idle timeout value that corresponds to the devolve action;
determining a continuity set identifier that is associated with the devolve action;
based on determining that the devolve action is associated with the aggregate flow entry, generating a first microflow flow entry in the flow table to define a first microflow, the first microflow flow entry including a data field identifying the continuity set identifier and at least one of a data field maintaining a first idle timer that has an initial value equal to the idle timeout value and a data field maintaining a hard timeout timer that has an initial value equal to a hard timeout value;
determining that at least one of the first idle timer and the hard timeout timer associated with the first microflow flow entry has timed out; and in response to determining that at least one of the first idle timer and the hard timeout timer has timed out, sending a controller node a microflow termination message that comprises the continuity set identifier.

* * * * *